United States Patent
Zhang et al.

(10) Patent No.: US 11,743,485 B2
(45) Date of Patent: Aug. 29, 2023

(54) SUB-BLOCK MOTION CANDIDATE LIST IN VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 4 days.

(21) Appl. No.: 17/238,548

(22) Filed: Apr. 23, 2021

(65) Prior Publication Data
US 2021/0243435 A1 Aug. 5, 2021

Related U.S. Application Data

(63) Continuation of application No. PCT/IB2019/059114, filed on Oct. 24, 2019.

(30) Foreign Application Priority Data

Oct. 24, 2018 (WO) ................. PCT/CN2018/111587
Dec. 28, 2018 (WO) ................. PCT/CN2018/124984

(51) Int. Cl.
*H04N 19/52* (2014.01)
*H04N 19/176* (2014.01)
(Continued)

(52) U.S. Cl.
CPC .......... *H04N 19/52* (2014.11); *H04N 19/105* (2014.11); *H04N 19/137* (2014.11);
(Continued)

(58) Field of Classification Search
CPC .. H04N 19/105; H04N 19/159; H04N 19/176; H04N 19/513
See application file for complete search history.

(56) References Cited

U.S. PATENT DOCUMENTS 9,215,470 B2 12/2015 Karczewicz et al.
9,288,507 B2 3/2016 Zhang et al.
(Continued)

FOREIGN PATENT DOCUMENTS

EP 3059965 A1 8/2016
WO 2017118409 A1 7/2017
(Continued)

OTHER PUBLICATIONS

Non-Final Office Action from U.S. Appl. No. 17/109,972 dated Nov. 1, 2021.
(Continued)

*Primary Examiner* — Jeremiah C Hallenbeck-Huber
(74) *Attorney, Agent, or Firm* — Perkins Coie LLP

(57) ABSTRACT

Devices, systems and methods for the simplification of sub-block motion candidate lists for video coding are described. In a representative aspect, a method for video processing includes determining, for a conversion between a current block of a video and a bitstream representation of the video, a sub-block level merge candidate list that includes at least one sub-block coding type. The method also includes performing the conversion based on the sub-block level merge candidate list.

20 Claims, 27 Drawing Sheets

(51) Int. Cl.
*H04N 19/184* (2014.01)
*H04N 19/105* (2014.01)
*H04N 19/159* (2014.01)
*H04N 19/513* (2014.01)
*H04N 19/56* (2014.01)
*H04N 19/137* (2014.01)
*H04N 19/30* (2014.01)

(52) U.S. Cl.
CPC ......... *H04N 19/159* (2014.11); *H04N 19/176* (2014.11); *H04N 19/184* (2014.11); *H04N 19/30* (2014.11); *H04N 19/513* (2014.11); *H04N 19/56* (2014.11)

(56) References Cited

U.S. PATENT DOCUMENTS

| | | | |
|---|---|---|---|
| 9,325,990 | B2 | 4/2016 | Chen et al. |
| 9,491,461 | B2 | 11/2016 | Chen et al. |
| 9,503,720 | B2 | 11/2016 | Chen et al. |
| 9,554,150 | B2 | 1/2017 | Zhang et al. |
| 9,596,448 | B2 | 3/2017 | Thirumalai et al. |
| 9,628,795 | B2 | 4/2017 | Zhang et al. |
| 9,674,542 | B2 | 6/2017 | Chen et al. |
| 9,756,336 | B2 | 9/2017 | Zhang et al. |
| 9,819,959 | B2 | 11/2017 | Zhang et al. |
| 9,900,593 | B2 | 2/2018 | Xiu et al. |
| 9,906,813 | B2 | 2/2018 | Zhang et al. |
| 9,912,964 | B2 | 3/2018 | Zhang et al. |
| 9,918,091 | B2 | 3/2018 | Wang et al. |
| 9,948,939 | B2 | 4/2018 | Zhang et al. |
| 9,955,186 | B2 | 4/2018 | Chon et al. |
| 9,967,592 | B2 | 5/2018 | Zhang et al. |
| 10,045,014 | B2 | 8/2018 | Zhang et al. |
| 10,165,252 | B2 | 12/2018 | An et al. |
| 10,230,980 | B2 | 3/2019 | Liu et al. |
| 10,244,253 | B2 | 3/2019 | Chen et al. |
| 10,271,048 | B2 | 4/2019 | Zhang et al. |
| 10,334,281 | B2 | 6/2019 | Zhang et al. |
| 10,390,044 | B2 | 8/2019 | Karczewicz et al. |
| 10,404,990 | B2 | 9/2019 | Hendry et al. |
| 10,412,387 | B2 | 9/2019 | Pang et al. |
| 10,412,406 | B2 | 9/2019 | Zhang et al. |
| 10,419,763 | B2 | 9/2019 | Huang et al. |
| 10,455,231 | B2 | 10/2019 | Xiu et al. |
| 10,477,214 | B2 | 11/2019 | Zhang et al. |
| 10,587,859 | B2 | 3/2020 | An et al. |
| 10,609,423 | B2 | 3/2020 | Chuang et al. |
| 10,687,055 | B2 | 6/2020 | Wang |
| 10,771,811 | B2 | 9/2020 | Liu et al. |
| 10,812,806 | B2 | 10/2020 | Zhang et al. |
| 10,834,419 | B2 | 11/2020 | Joshi et al. |
| 2012/0287999 | A1 | 11/2012 | Li et al. |
| 2013/0329007 | A1 | 12/2013 | Zhang et al. |
| 2014/0355687 | A1* | 12/2014 | Takehara ............ H04N 19/513 375/240.16 |
| 2015/0264356 | A1 | 9/2015 | Zhang et al. |
| 2015/0271515 | A1* | 9/2015 | Pang .................... H04N 19/70 375/240.16 |
| 2015/0373350 | A1 | 12/2015 | Hendry et al. |
| 2016/0219278 | A1 | 7/2016 | Chen et al. |
| 2016/0286232 | A1 | 9/2016 | Li et al. |
| 2017/0238005 | A1 | 8/2017 | Chien et al. |
| 2017/0332099 | A1* | 11/2017 | Lee ........................ H04N 19/52 |
| 2018/0070100 | A1 | 3/2018 | Chen et al. |
| 2018/0131952 | A1 | 5/2018 | Xiu et al. |
| 2018/0146197 | A1 | 5/2018 | Yi et al. |
| 2018/0192072 | A1 | 7/2018 | Chen et al. |
| 2018/0255305 | A1 | 9/2018 | Wang |
| 2018/0310017 | A1* | 10/2018 | Chen ...................... H04N 19/52 |
| 2018/0352247 | A1 | 12/2018 | Park et al. |
| 2018/0359483 | A1* | 12/2018 | Chen ...................... H04N 19/70 |
| 2018/0376160 | A1* | 12/2018 | Zhang ................. H04N 19/105 |
| 2019/0028731 | A1 | 1/2019 | Chuang et al. |
| 2019/0058896 | A1* | 2/2019 | Huang ................. H04N 19/105 |
| 2019/0182502 | A1* | 6/2019 | Xu ....................... H04N 19/513 |
| 2019/0222839 | A1* | 7/2019 | Jang ..................... H04N 19/176 |
| 2019/0222865 | A1 | 7/2019 | Zhang et al. |
| 2019/0306502 | A1 | 10/2019 | Gadde et al. |
| 2020/0045336 | A1 | 2/2020 | Xiu et al. |
| 2020/0077113 | A1 | 3/2020 | Huang et al. |
| 2020/0084441 | A1* | 3/2020 | Lee ....................... H04N 19/105 |
| 2020/0112715 | A1 | 4/2020 | Hung et al. |
| 2020/0267382 | A1 | 8/2020 | Li et al. |
| 2020/0267418 | A1 | 8/2020 | Chuang et al. |
| 2020/0275122 | A1 | 8/2020 | Ahn et al. |
| 2020/0322628 | A1 | 10/2020 | Lee et al. |
| 2020/0366930 | A1* | 11/2020 | Lee ....................... H04N 19/119 |
| 2020/0374543 | A1 | 11/2020 | Liu et al. |
| 2021/0021865 | A1 | 1/2021 | Zheng et al. |
| 2021/0092431 | A1 | 3/2021 | Zhang et al. |
| 2021/0092436 | A1 | 3/2021 | Zhang et al. |
| 2021/0105482 | A1 | 4/2021 | Xiu et al. |
| 2021/0112248 | A1 | 4/2021 | Zhang et al. |
| 2021/0120243 | A1 | 4/2021 | Zhang et al. |
| 2021/0136363 | A1 | 5/2021 | Jang |
| 2021/0243434 | A1 | 8/2021 | Zhang et al. |
| 2021/0266593 | A1 | 8/2021 | Zhang et al. |

FOREIGN PATENT DOCUMENTS

| | | |
|---|---|---|
| WO | 2018052986 A1 | 3/2018 |
| WO | 2019074273 A1 | 4/2019 |
| WO | 2019089864 A1 | 5/2019 |
| WO | 2020017861 A1 | 1/2020 |
| WO | 2020017892 A1 | 1/2020 |

OTHER PUBLICATIONS

Non-Final Office Action from U.S. Appl. No. 17/230,128 dated Jan. 21, 2022.

Final Office Action from U.S. Appl. No. 17/109,972 dated Feb. 11, 2022.

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0366, 2018.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0369, 2018.

Chien et al. "Sub-Block Motion Derivation for Merge Mode in HEVC," Proceedings of SPIE, US, Sep. 2016, vol. 9971, pp. 99711K-1 to 99711K-7.

Fu et al. "Non-CE4: Separate Merge Candidate List for Sub-Block Modes," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0364, 2018.

JEM-7.0 httpsjvet.hhi.fraunhofer.desvnsvn_HMJEMSoftwaretags HM-16.6-JEM-7.0.(only website).

H.265HEVC, httpswww.itu.intrecT-REC-H.265(only website).

Han et al. "CE4.2.3: Improvement on Merge/Skip Mode," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0339, 2018.

Huang et al. "CE4.2.5: Simplification of Affine Merge List Construction and Move ATMVP to Affine Merge List," Joint Video

(56) References Cited

OTHER PUBLICATIONS

Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

Wang et al. "CE4-Related: Simplification of ATMVP Candidate Derivation," Joint Video Experts Team (JVET) of ITU-T SG 16WP3 and ISO/IEC JTC 1/SC29/WG 11, 12th Meeting, Macao, CN, Oct. 3-12, 2018, document JVET-L0198, 2018.

Xiu et al. "CE4.2.5: Simplification on Advanced Temporal Motion Vector Prediction (ATMVP)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0341, 2018.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1024, 2018.

Zhang et al. "CE4-Related: History-based Motion Vector Prediction," Joint Video Experts Team ((JVET) of ITU-T SG WP 3 and ISO/IEC JTC 1/SC 29/WG 11, 11th Meeting, Ljubljana, SI, Jul. 10-18, 2018, document JVET-K0104, 2018.

International Search Report and Written Opinion from PCT/IB2019/059109 dated Feb. 27, 2020 (17 pages).

International Search Report and Written Opinion from PCT/IB2019/059110 dated Feb. 27, 2020 (17 pages).

International Search Report and Written Opinion from PCT/IB2019/059111 dated Mar. 5, 2020 (16 pages).

International Search Report and Written Opinion from PCT/IB2019/059114 dated Mar. 11, 2020 (19 pages).

Non-Final Office Action from U.S. Appl. No. 17/109,972 dated Mar. 11, 2021.

Final Office Action from U.S. Appl. No. 17/230,128 dated Dec. 14, 2022.

\* cited by examiner

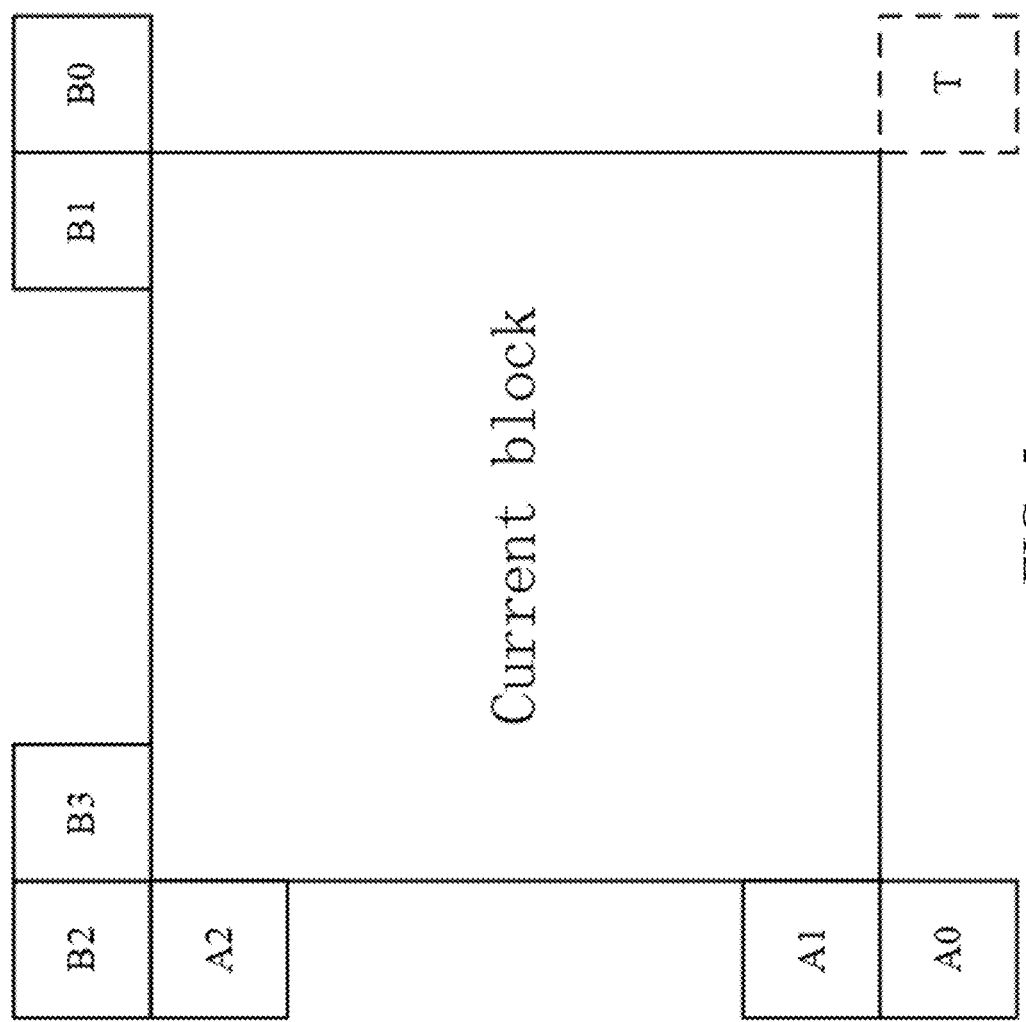

SUB-BLOCK MOTION CANDIDATE LIST IN VIDEO CODING

CROSS REFERENCE TO RELATED APPLICATIONS

This application is a continuation of International Application No. PCT/IB2019/059114 filed Oct. 24, 2019, which claims the priority to and benefit of International Patent Application No. PCT/CN2018/111587, filed on Oct. 24, 2018 and International Patent Application No. PCT/CN2018/124984, filed on Dec. 28, 2018. The entire disclosures of the above applications are incorporated by reference as part of the disclosure of this patent document.

TECHNICAL FIELD

This patent document is directed generally to image and video coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to simplifying sub-block motion candidate lists for video coding are described. The described methods may be applied to both the existing video coding standards (e.g., High Efficiency Video Coding (HEVC)) and future video coding standards or video codecs.

In one representative aspect, the disclosed technology can be used to provide a method for video processing. The method includes determining, during a conversion between a current block of visual media data and a bitstream representation of the current block, a temporal motion vector prediction candidate for at least a sub-block of the current block and performing the conversion based on the temporal motion vector prediction candidate for the sub-block. The temporal motion vector prediction candidate is determined based on K neighboring blocks of the current block, K being a positive integer.

In another representative aspect, the disclosed technology may be used to provide a method for video processing. This method includes determining, during a conversion between a current block of a video and a bitstream representation of the video, a temporal motion vector prediction candidate based on a temporal neighboring block of the current block. The temporal neighboring block is identified based on motion information of a spatial neighboring block selected from one or more spatial neighboring blocks that are different from at least one spatial neighboring block used in a merge list construction process of a video block. The method also includes performing the conversion based on the temporal motion vector prediction candidate.

In another representative aspect, the disclosed technology may be used to provide a method for video processing. This method includes maintaining, for a conversion between a current block of a video and a bitstream representation of the video, a table of motion candidates based on past conversions of the video and the bitstream representation; deriving a temporal motion vector prediction candidate based on the table of motion candidates; and performing the conversion based on the temporal motion vector prediction candidate.

In another representative aspect, the disclosed technology may be used to provide a method for video processing. This method includes determining, for a conversion between a current block of a video and a bitstream representation of the video, one or more temporal motion vector prediction candidates for the current block and performing the conversion based on the one or more temporal motion vector prediction candidates. The one or more temporal motion vector prediction candidates can be determined by identifying a first temporal adjacent block of the current block based on an initial motion vector, wherein the first temporal adjacent block includes invalid motion information, and examining additional temporal adjacent blocks to obtain the one or more temporal motion vector prediction candidates.

In another representative aspect, the disclosed technology may be used to provide a method for video processing. This method includes determining, for a conversion between a current block of a video and a bitstream representation of the video, one or more temporal motion vector prediction candidates for the current block. The one or more temporal motion vector prediction candidates comprise a default temporal motion vector prediction candidate. The method also includes performing the conversion based on the one or more temporal motion vector prediction candidates.

In another representative aspect, the disclosed technology may be used to provide a method for video processing. This method includes determining, for a conversion between a current block of a video and a bitstream representation of the video, a sub-block level merge candidate list that includes at least one sub-block coding type. The method also includes performing the conversion based on the sub-block level merge candidate list.

In another representative aspect, the disclosed technology may be used to provide a method for video processing that includes determining, for a conversion between a current block of a video and a bitstream representation of the video, a sub-block level coding technique based on an indication that is signaled in a picture header, a picture parameter set (PPS), a slice header, or a tile group header. The method also includes performing the conversion based on the sub-block level coding technique.

In another representative aspect, the disclosed technology may be used to provide a method for video processing that includes determining, for a conversion between a current block of a video and a bitstream representation of the video, a sub-block level temporal motion candidate using a derivation process applicable to a block level temporal motion vector prediction candidate conversion between the current block and the bitstream representation, and performing the conversion based on the sub-block level temporal motion candidate.

In another representative aspect, the disclosed technology may be used to provide a method for video processing that includes determining, for a conversion between a current block of a video and a bitstream representation of the video, a block level temporal motion vector prediction candidate using a derivation process applicable to a sub-block level temporal motion candidate conversion between the current block and the bitstream representation, and performing the conversion based on the block level temporal motion vector prediction candidate.

In another representative aspect, the disclosed technology may be used to provide a method for video processing. This method includes selecting, for sub-block level processing of a current video block, motion information associated with a spatial neighboring block, deriving, based on the motion information, a motion vector prediction candidate, adding the motion vector prediction candidate to a sub-block based merge list that is different from a merge list, where the sub-block based merge list excludes block-level prediction candidates, and reconstructing the current video block or decoding other video blocks based on the motion vector prediction candidate.

In another representative aspect, the disclosed technology may be used to provide a method for video processing. This method includes deriving, for sub-block level processing of a current video block, a motion vector prediction candidate, assigning a merge index to a type of the motion vector prediction candidate, and adding the motion vector prediction candidate and the merge index to a sub-block based merge list that is different from a merge list, where the sub-block based merge list excludes block-level prediction candidates.

In yet another representative aspect, the disclosed technology may be used to provide a method for video processing. This method includes deriving, for sub-block level processing of a current video block, a motion vector prediction candidate, and adding, based on an adaptive ordering, the motion vector prediction candidate to a sub-block based merge list that is different from a merge list, where the sub-block based merge list excludes block-level prediction candidates.

In another example aspect, a method of video processing is disclosed. The method includes determining a default motion candidate for a sub-block based coding mode for a conversion between a current video block and a bitstream representation of the current video block using one of the following: (a) a uni-prediction candidate that is derived by scaling a starting motion candidate to a reference picture index within a reference picture list X; or (b) a bi-prediction candidate that is derived by scaling to reference picture indexes within two reference picture lists; or (c) candidate in either (a) or (b) depending on a picture type or a slice type of the current video block; or (d) a candidate derived for a temporal motion vector predictor (TMVP) process of the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 5 shows an example of candidate positions for affine merge mode.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Figure 1:
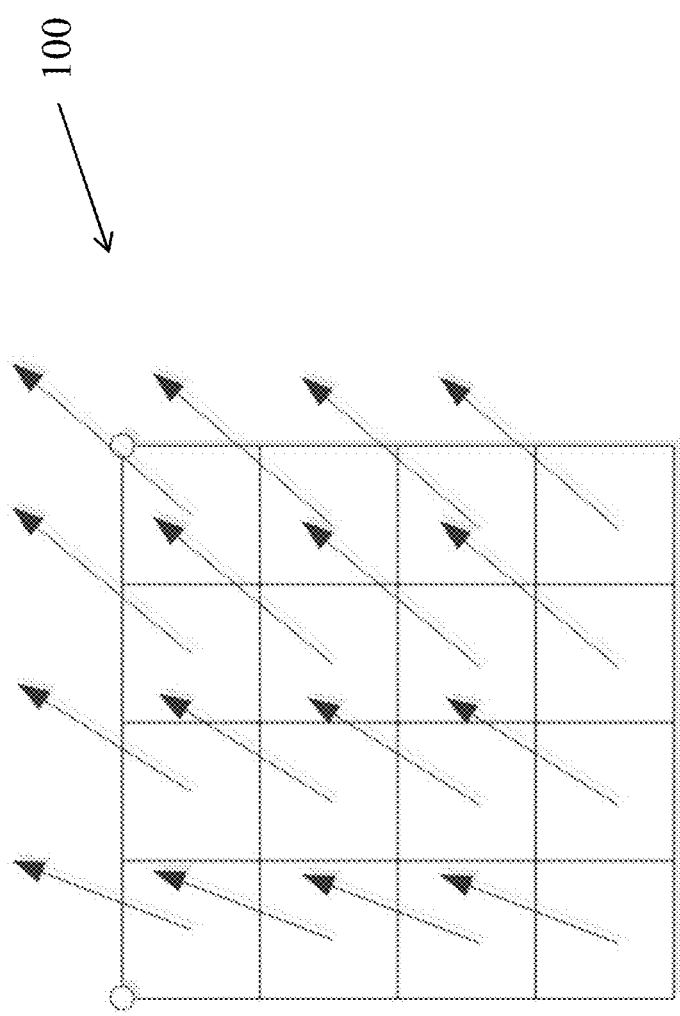
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to reduce hardware implementation complexity or improve coding performance. Section headings are used in the present document to improve readability of the description and do not in any way limit the discussion or the embodiments (and/or implementations) to the respective sections only.

1. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC). Affine prediction has also been adopted into VVC.

1.1 Examples of Affine Prediction

Figure 2A:
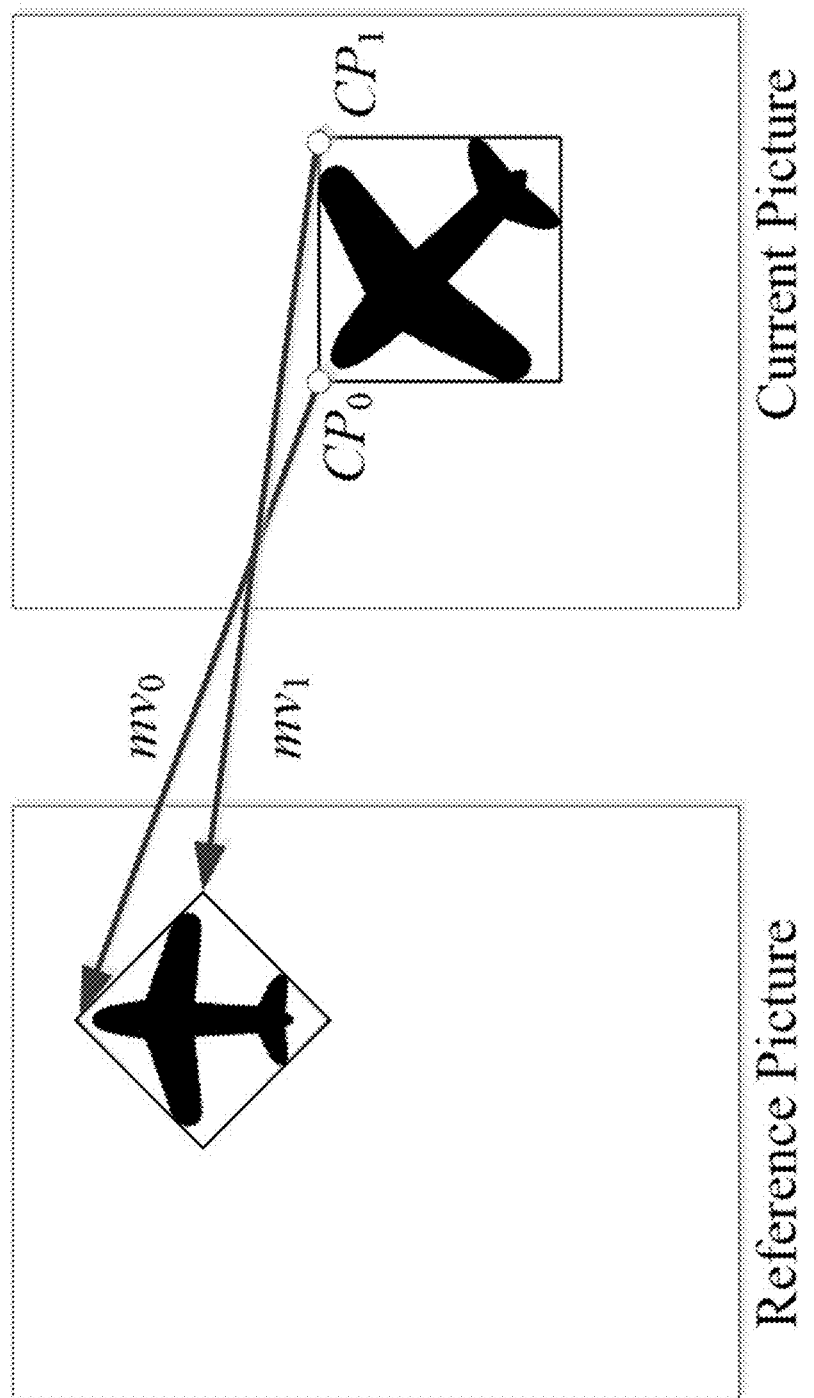
FIGS. 2A and 2B show examples of the simplified 4-parameter affine model and the simplified 6-parameter affine model, respectively.
Figure 2B:
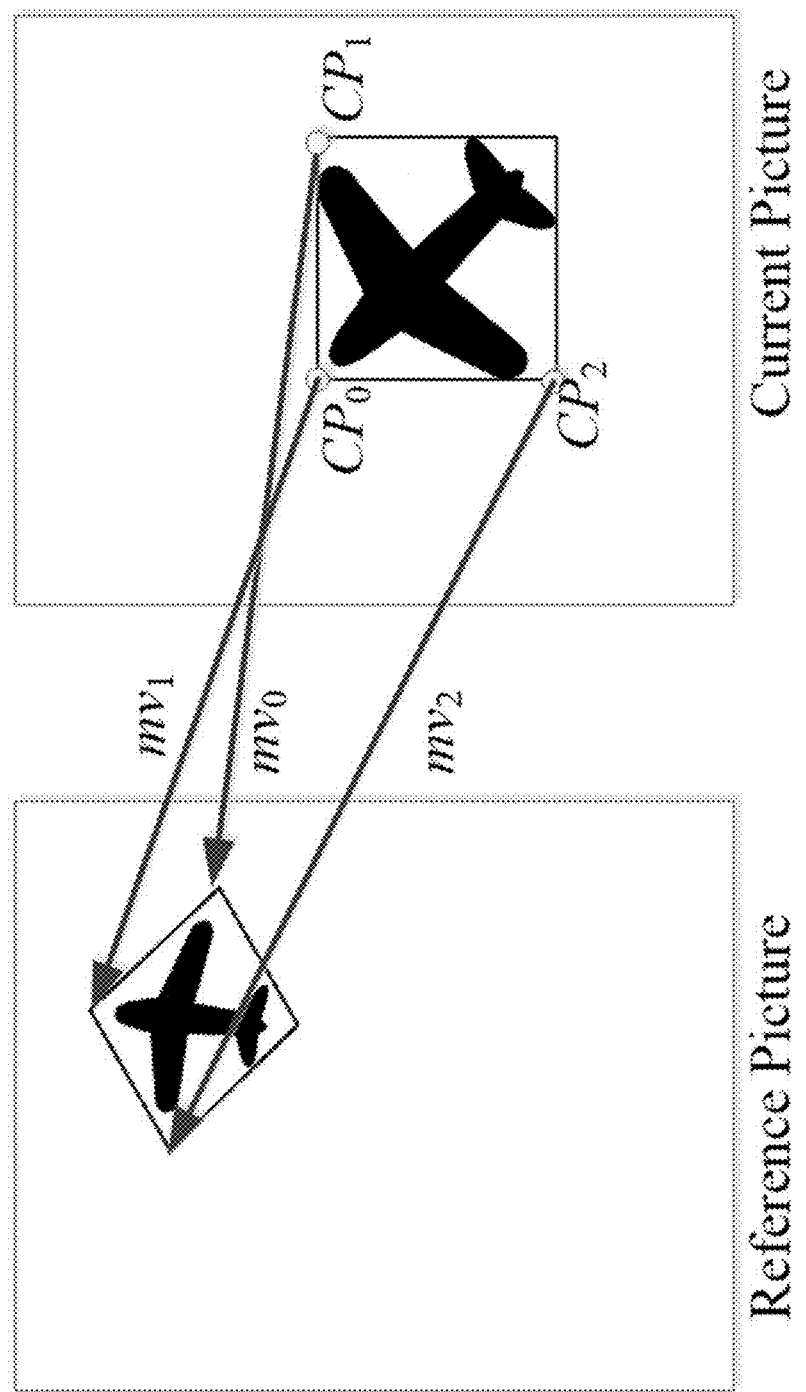

In HEVC, only a translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIGS. 2A and 2B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, Equations (1) and (2) are implemented as:

$$\begin{cases} iDMvHorX = (mv_1^h - mv_0^h) \ll (S - \log 2(w)) \\ iDMvHorY = (mv_1^v - mv_0^v) \ll (S - \log 2(w)) \end{cases} \quad \text{Eq. (3)}$$

For the 4-parameter affine model shown in Equation (1):

$$\begin{cases} iDMvVerX = -iDMvHorY \\ iDMvVerY = iDMvHorX \end{cases} \quad \text{Eq. (4)}$$

For the 6-parameter affine model shown in Equation (2):

$$\begin{cases} iDMvVerX = (mv_2^h - mv_0^h) \ll (S - \log 2(h)) \\ iDMvVerY = (mv_2^v - mv_0^v) \ll (S - \log 2(h)) \end{cases} \quad \text{Eq. (5)}$$

And thus, the motion vectors may be derived as:

$$\begin{cases} mv^h(x, y) = \text{Normalize}(iDMvHorX \cdot x + \\ \quad iDMvVerX \cdot y + (mv_0^h \ll S), S) \\ mv^v(x, y) = \text{Normalize}(iDMvHorY \cdot x + \\ \quad iDMvVerY \cdot y + (mv_0^v \ll S), S) \end{cases} \quad \text{Eq. (6)}$$

$$\text{Normalize}(Z, S) = \begin{cases} (Z + \text{Off}) \gg S & \text{if } Z \geq 0 \\ -((-Z + \text{Off}) \gg S) & \text{Otherwise} \end{cases} \quad \text{Eq. (7)}$$

$$\text{Off} = 1 \ll (S - 1)$$

Herein, S represents the calculation precision. e.g. in VVC, S=7. In VVC, the MV used in MC for a sub-block with the top-left sample at (xs, ys) is calculated by Equation (6) with x=xs+2 and y=ys+2.

Figure 3:
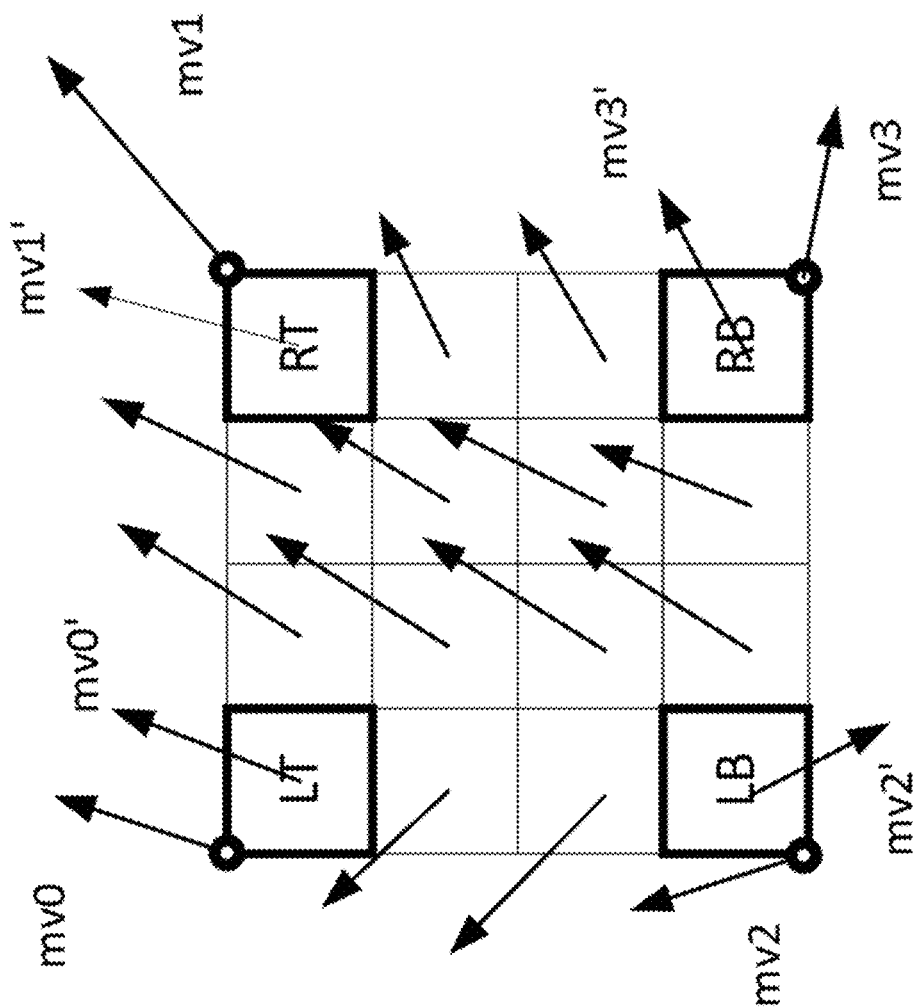
FIG. 3 shows an example of an affine motion vector field (MVF) per sub-block.

To derive motion vector of each 4×4 sub-block, the motion vector of the center sample of each sub-block, as shown in FIG. 3, is calculated according to Equations (1) or (2), and rounded to 1/16 fraction accuracy. Then the motion compensation interpolation filters are applied to generate the prediction of each sub-block with derived motion vector.

Figure 4A:
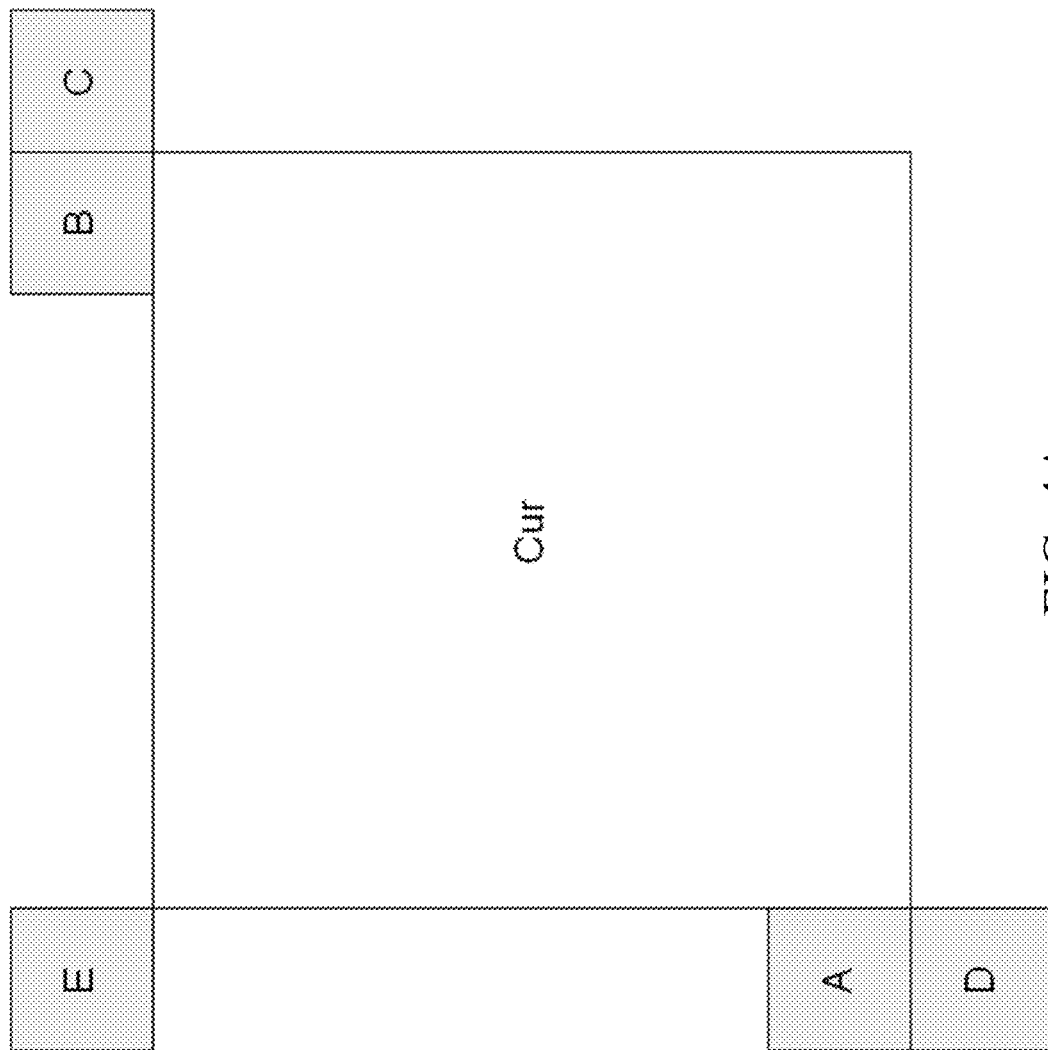
FIGS. 4A and 4B show example candidates for the AF_MERGE affine motion mode.
Figure 4B:
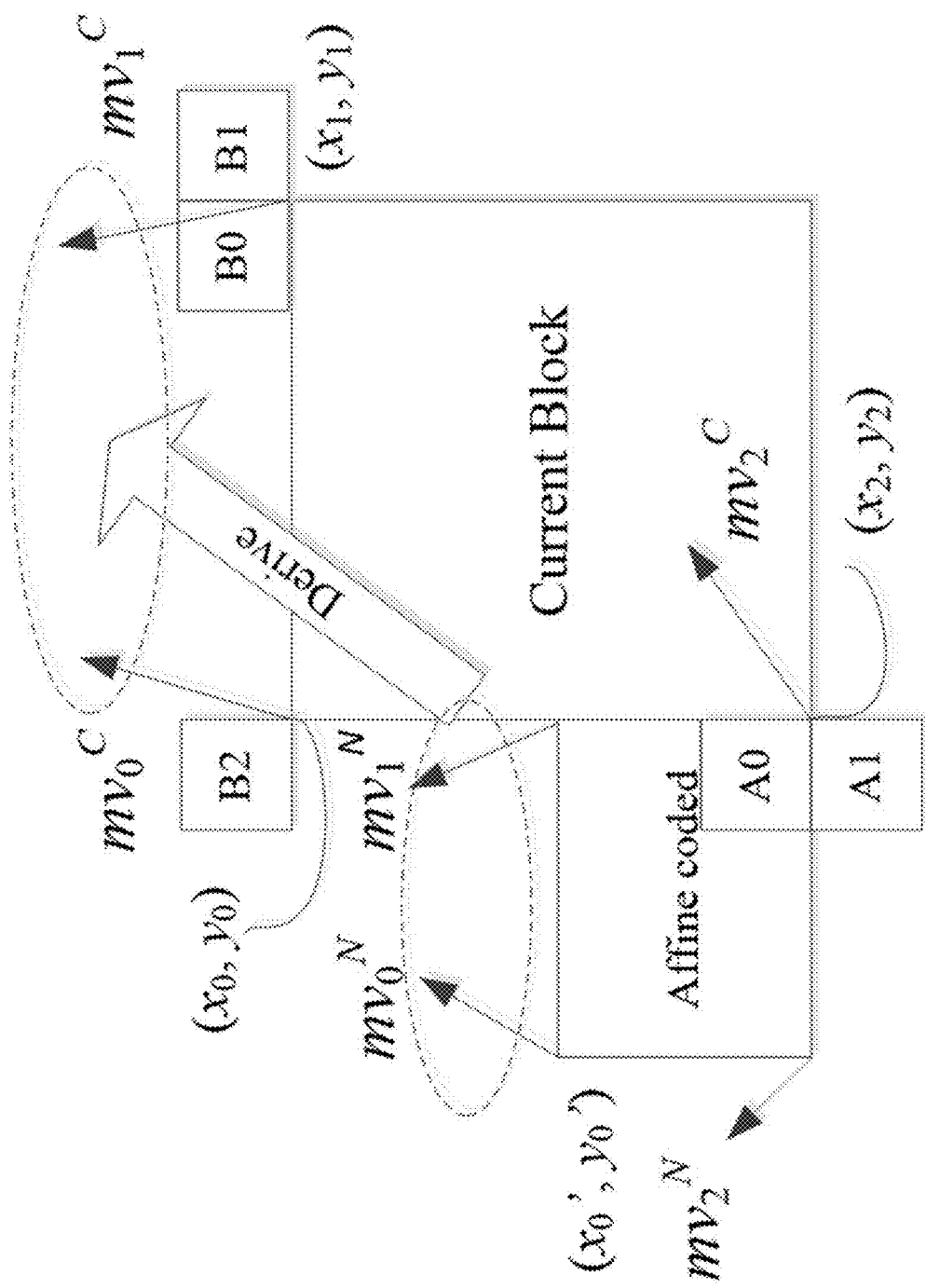

Affine model can be inherited from spatial neighbouring affine-coded block such as left, above, above right, left bottom and above left neighbouring block as shown in FIG. 4A. For example, if the neighbour left bottom block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

In some embodiments (e.g., VTM-2.0), sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

In some embodiments, when a CU is coded with affine merge mode, e.g., in AF_MERGE mode, it gets the first block coded with affine mode from the valid neighbour reconstructed blocks. And the selection order for the candidate block is from left, above, above right, left bottom to above left as shown in FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block derives its motion information based on the derived CP MVs of current block.

2. Example Embodiments

Different from VTM wherein only one affine spatial neighboring block may be used to derive affine motion for a block, a separate list of affine candidates is constructed for the AF_MERGE mode.

(1) Insert Inherited Affine Candidates into Candidate List

In an example, inherited affine candidate means that the candidate is derived from the valid neighbor reconstructed block coded with affine mode.

As shown in FIG. 5, the scan order for the candidate block is $A_1$, $B_1$, $B_0$, $A_0$ and $B_2$. When a block is selected (e.g., $A_1$), the two-step procedure is applied:

(a) Firstly, use the three corner motion vectors of the CU covering the block to derive two/three control points of current block; and (b) Based on the control points of current block to derive sub-block motion for each sub-block within current block.

(2) Insert Constructed Affine Candidates

In some embodiments, if the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is available, $B_3$ is used. If both $B_2$ and $B_3$ are unavailable, $A_2$ is used. If all the three candidates are unavailable, the motion information of CP1 cannot be obtained.

For CP2, the checking priority is $B_1 \rightarrow B_0$;
For CP3, the checking priority is $A_1 \rightarrow A_0$;
For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

(3) Insert Zero Motion Vectors

If the number of candidates in affine merge candidate list is less than MaxNumAffineCand, zero motion vectors are insert into the candidate list, until the list is full.

3. Examples of Advanced Temporal Motion Vector Prediction (ATMVP)

In some existing implementations, advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:

The collocated pictures of different ATMVP CUs may not be the same if multiple reference pictures are used. This means the motion fields of multiple reference pictures need to be fetched.

The motion information of each ATMVP CU is always derived based on 4×4 units, resulting in multiple invocations of motion derivation and motion compensation for each 4×4 sub-block inside one ATMVP CU.

3.1 Examples of Simplified Collocated Block Derivation with One Fixed Collocated Picture In this example method, one simplified design is described to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

3.2 Examples of Adaptive ATMVP Sub-Block Size

In this example method, the slice-level adaptation of the sub-block size is supported for ATMVP motion derivation. In some cases, the ATMVP is also known as sub-block temporal motion vector prediction (sbTMVP). Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

3.3 Examples of a Simplified ATMVP Derivation

In some embodiments, ATMVP predicts the motion vectors of the sub-CUs within a CU in two steps. The first step is to identify the corresponding block in the collocated picture signaled at the slice header. The second step is to split the current CU into sub-CUs and obtain the motion information of each sub-CU from the block corresponding to each sub-CU in the collocated picture.

Figure 6:
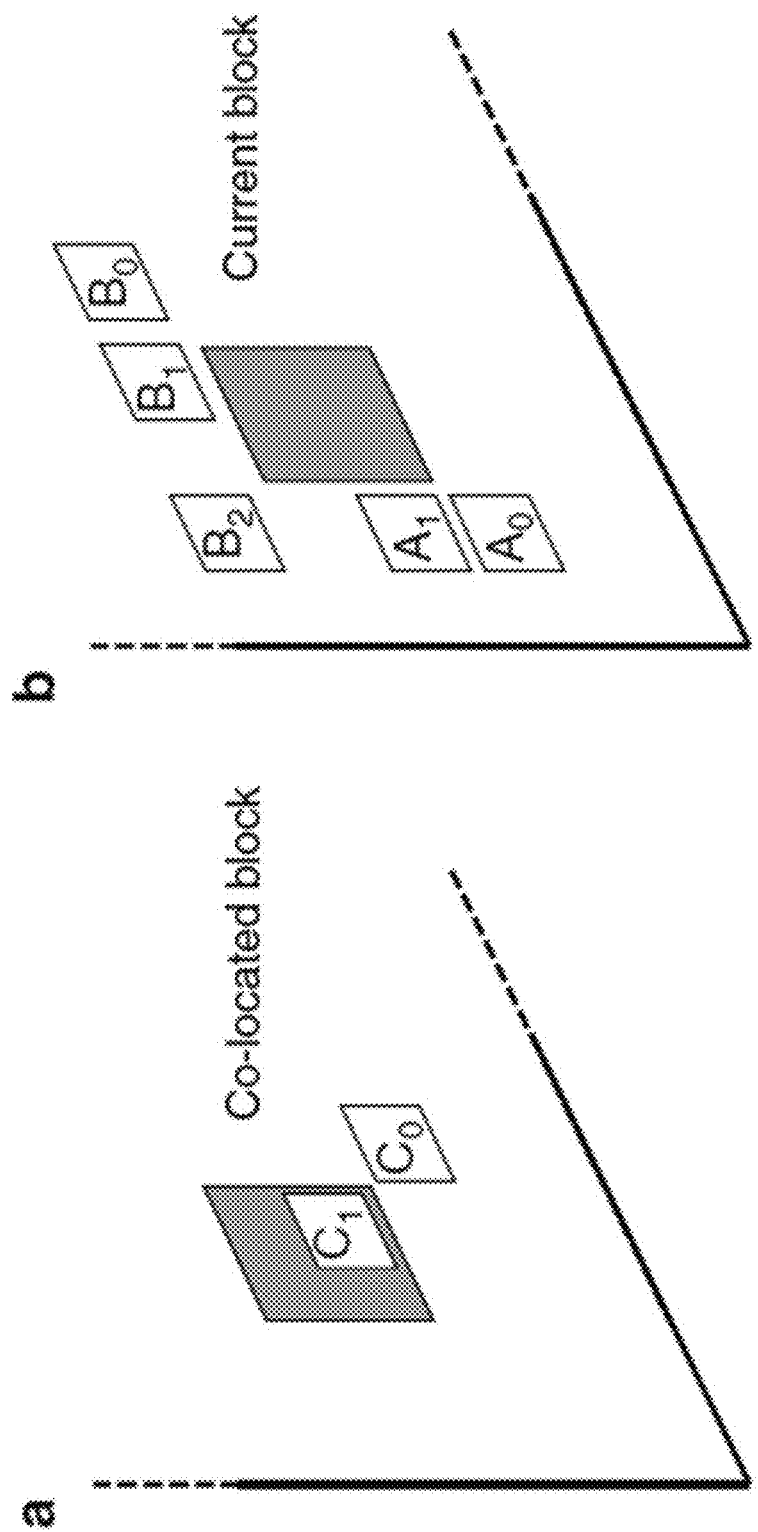
FIG. 6 shows another example of candidate positions for affine merge mode.

In the first step, the collocated block is identified by always scanning the MVs of the spatial merge candidates twice (once for each list). The construction of merge candidates list is performed by checking $A_1 \to B_1 \to B_0 \to A_0 \to ATMVP \to B_2 \to TMVP$, as shown in FIG. 6. Therefore, the number of MVP candidates in the merge list is up to 4 before ATMVP, which means that in the worst case, the scanning process in the first step needs to check all the 4 candidate blocks for each list.

To simplify the neighboring blocks' scanning process, the method restricts the number of scanning process for deriving the collocated block to one time, which means that only the first available candidate in the merge list is checked. If the candidate doesn't satisfy the condition of ATMVP neighboring blocks scanning in current VVC working draft (none of motion vectors associated with list 0 and list1 is pointing to the collocated picture), zero motion vector will be used to derive the collocated block in the collocated picture. In this method, the checking process is performed up to 1 time. Such a motion vector (e.g., in current design, it could be motion associated with one spatial neighboring block, or zero motion vector) is called a starting point MV for ATMVP.

3.4 Derivation of Sub-Blocks' Motion Information

Two steps are performed in order to fill in all motion information of different sub-blocks.
1. Find default motion information:
  1. Identify a block based on the center position within the current block and the starting point MV in the collocated picture (i.e., a block covering (x0+W/2+(SPMV_X>>K), y0+H/2+(SPMV_Y>>K)) wherein (x0, y0) is the top-left sample's coordinate, (W, H) is the block's width and height, respectively; (SPMV_X, SPMV_Y) are the starting point MV and K represents the motion vector's precision, (SPMV_X>>K, SPMV_Y>>K) denotes the integer MV).
  2. If the identified block is intra coded, ATMVP process is terminated and ATMVP candidate is set to unavailable.
  3. Otherwise (the identified block is inter coded), motion information of the identified block may be utilized to derive default motion information (e.g., scaled to certain reference pictures). The default motion information could be either uni-prediction or bi-prediction depending on the reference pictures.

Figure 15:
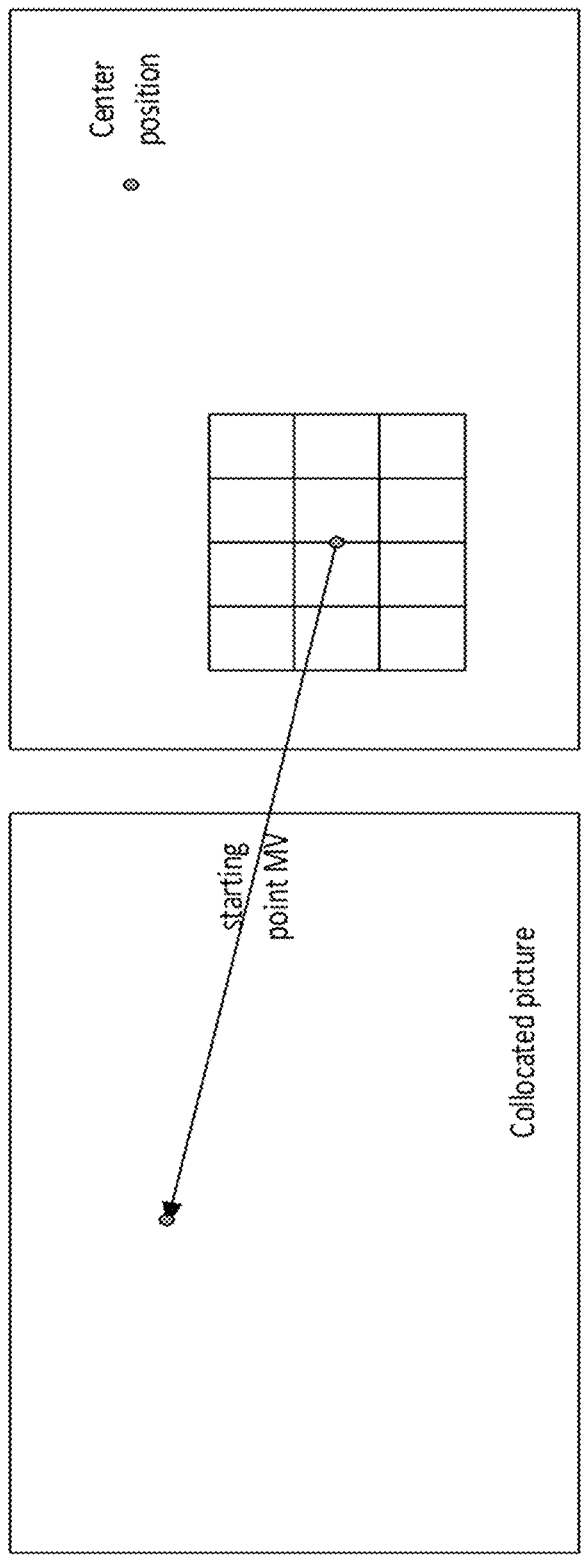
FIG. 15 shows an example of how to identify the represented block for default motion derivation.

FIG. 15 shows an example of how to identify the represented block for default motion derivation. The block covering the position (filled circle) in the collocated picture is the represented block for default motion derivation.
  2. If default motion is found, for each sub-block, based on its center position within the sub-block and the starting point MV to locate a representative block in the collocated picture.
    1. If the representative block is coded as inter-mode, the motion information of the representative block is utilized to derive the final sub-block's motion (i.e., scaled to certain reference pictures).
    2. If the representative block is coded as intra-mode, the sub-block's motion is set to the default motion information.

4. Examples of Spatial-Temporal Motion Vector Prediction (STMVP)

Figure 7:
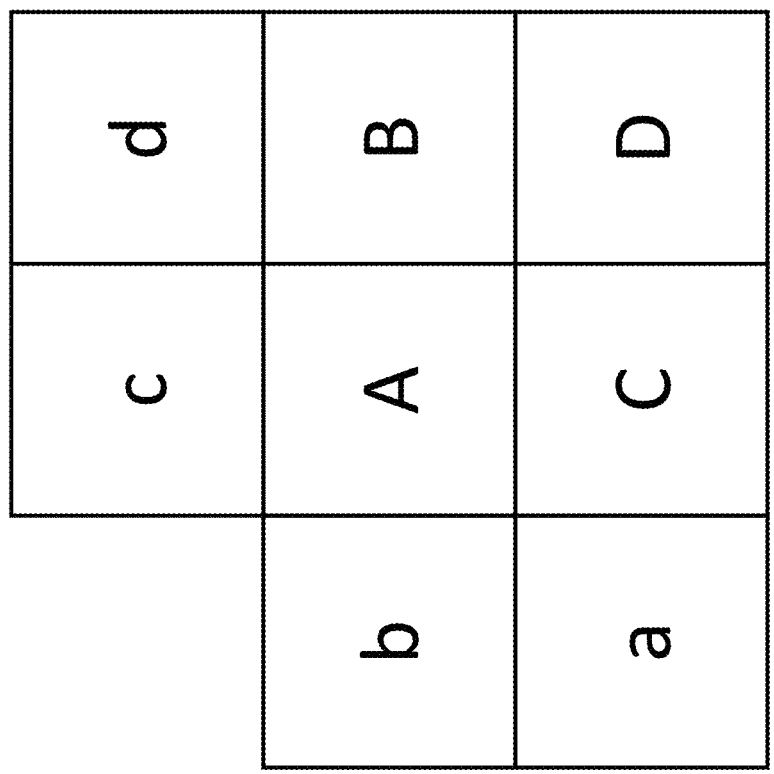
FIG. 7 shows an example of one coding unit (CU) with sub-blocks and neighboring blocks of the CU.

In the STMVP method, the motion vectors of the sub-CUs are derived recursively, following raster scan order. FIG. 7 shows an example of one CU with four sub-blocks and neighboring blocks. Consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

5. Example Embodiments of Affine Merge Candidate Lists

5.1 Example Embodiments

In the affine merge mode of VTM-2.0.1, only the first available affine neighbour can be used to derive motion information of affine merge mode. In some embodiments, a candidate list for affine merge mode is constructed by searching valid affine neighbours and combining the neighbor motion information of each control point.

The affine merge candidate list is constructed as following steps:

(1) Insert Inherited Affine Candidates

Figure 8:
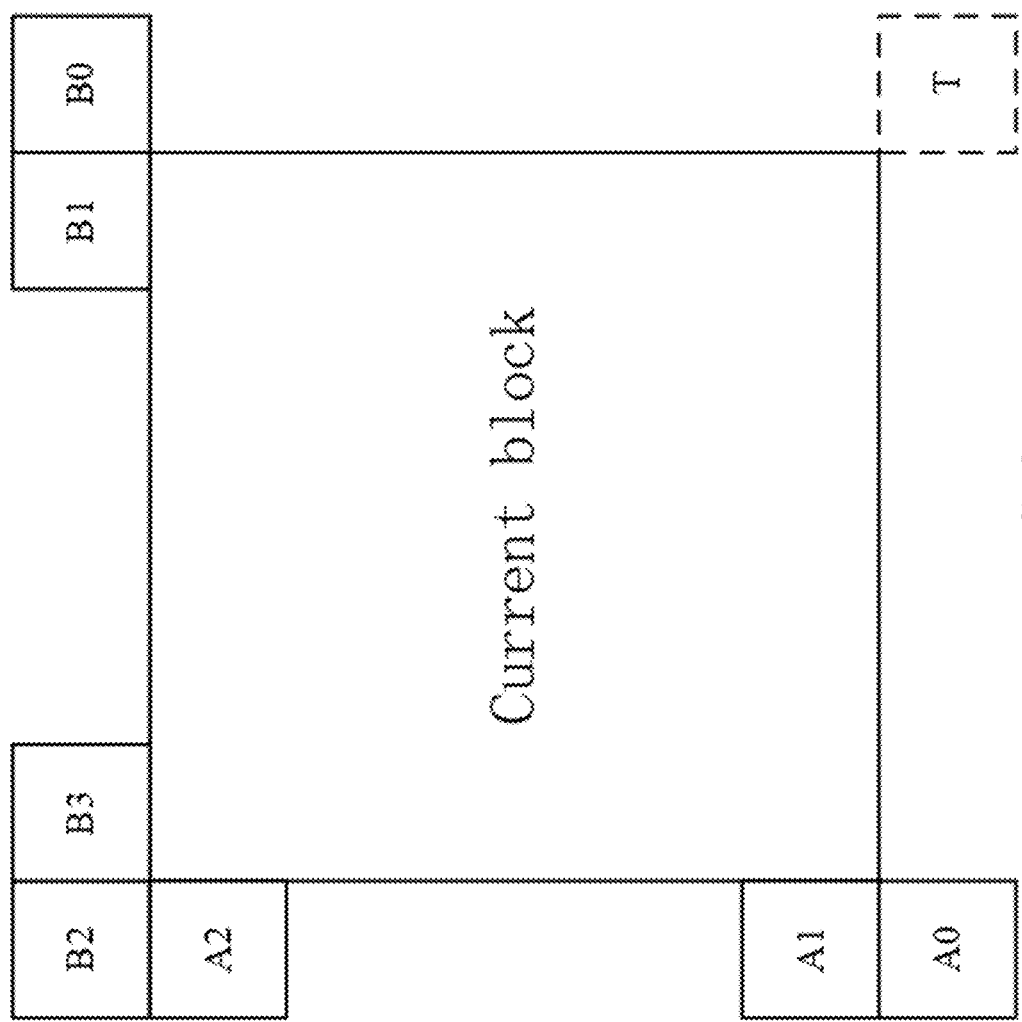
FIG. 8 shows yet another example of candidate positions for affine merge mode.

Inherited affine candidate means that the candidate is derived from the affine motion model of its valid neighbor affine coded block. In the common base, as shown in FIG. 8, the scan order for the candidate positions is: A1, B1, B0, A0 and B2.

After a candidate is derived, full pruning process is performed to check whether same candidate has been inserted into the list. If a same candidate exists, the derived candidate is discarded.

(2) Insert Constructed Affine Candidates

If the number of candidates in affine merge candidate list is less than MaxNumAffineCand (set to 5 in this example), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 8. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is available, $B_3$ is used. If both $B_2$ and $B_3$ are unavailable, $A_2$ is used. If all the three candidates are unavailable, the motion information of CP1 cannot be obtained.

For CP2, the checking priority is $B_1 \rightarrow B_0$;

For CP3, the checking priority is $A_1 \rightarrow A_0$;

For CP4, T is used.

Secondly, the combinations of controls points are used to construct the motion model.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} are converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} are converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference picture list X (X being 0 or 1) of a combination, the reference picture index with highest usage ratio in the control points is selected as the reference picture index of list X, and motion vectors point to difference reference picture are scaled.

After a candidate is derived, full pruning process is performed to check whether same candidate has been inserted into the list. If a same candidate exists, the derived candidate is discarded.

(3) Padding with Zero Motion Vectors

If the number of candidates in affine merge candidate list is less than 5, zero motion vectors with zero reference indices are insert into the candidate list, until the list is full.

Therefore, the complexity of this separate affine merge list is generated as follows:

| Merge list size | Max inherited affine candidate | Max constructed affine candidate | Max candidate comparison | MV scaling | Additional buffer |
| --- | --- | --- | --- | --- | --- |
| 5 | 1 | 6 | 0 | 2 | 2× |

6. Examples of a Sub-Block Merge Candidate List

In some embodiments, all the sub-block related motion candidates are put in a separate merge list in addition to the regular merge list for non-sub block merge candidates. For example, the sub-block related motion candidates are put in a separate merge list is named as 'sub-block merge list'. In one example, the sub-block merge list includes affine merge candidates, and ATMVP candidate, and/or sub-block based STMVP candidate.

6.1 Example Embodiments

In some embodiments, the ATMVP merge candidate in the normal merge list is moved to the first position of the affine merge list. Such that all the merge candidates in the new list (e.g., sub-block based merge candidate list) are based on sub-block coding tools.

7. Drawbacks of Existing Methods

The idea of using the first available spatial merge candidate is beneficial for the case when ATMVP candidate is added to the regular merge mode. When ATMVP candidate is added to the sub-block based merge list, it still requires to go through the regular merge list construction process which interrupts the motivation of adding ATMVP to the sub-block based merge list, that is, reducing the interaction between sub-block merge list and regular merge list. For the worst case, it still requires to check the availability of four spatial neighboring blocks and check whether it is intra coded or not.

In some embodiments, an ATMVP candidate is always inserted to the merge list before affine motion candidates which may be not be efficient for sequences with affine motion.

In some embodiments, an ATMVP candidate may be unavailable after checking the temporal block in the co-located picture. Therefore, for a given merge index, e.g., equal to 0, it may represent an ATMVP candidate or an affine merge candidate which is not compatible with a simplified hardware implementation.

8. Example Methods for Simplifying Sub-Block Motion Candidate Lists

Embodiments of the disclosed technology simplify generating sub-block motion candidate lists, which may improve video coding efficiency and enhance both existing and future video coding standards, are elucidated in the following examples described for various implementations. In the following examples, which should not be construed to be limiting, the term 'ATMVP' is not restricted to be 'sub-block based ATMVP', it could also represent the 'non-sub-block based ATMVP' which could also be interpreted as a TMVP candidate. In addition, the following methods may also be applied to other motion candidate list construction process, such as AMVP candidate list, regular merge candidate with non-sub-block merge candidates.

Furthermore, in the following examples, a motion category is defined as including all motion candidates derived with the same coding tool. In other words, for each coding tool, such as affine, ATMVP, STMVP, the corresponding motion candidates belonging to a single motion category.

Example 1

Instead of finding the first available merge candidate in the regular merge list for the ATMVP candidate derivation, the motion information of only one spatial neighboring block may be accessed and utilized in the ATMVP candidate derivation process. For example, if the motion information of the only spatial neighboring block is available, the ATMVP candidate can be determined based on such motion information. As another example, if the motion information of the only spatial neighboring block is not available, the ATMVP candidate can be determined based on default motion information, such as a zero motion vector.

In some embodiments, the only spatial neighboring block is defined as the first spatial neighboring block to be checked in the regular merge list, such as $A_1$ depicted in FIG. 5.

In some embodiments, the only spatial neighbouring block is defined as the first available spatial neighbouring block in a checking order, such as A1, B1, B0, A0, B2. For example, when a neighboring block exists and has been coded when coding the current block, it is treated as available. In some embodiments, when a neighboring block exists in the same tile and has been coded when coding the current block, it is treated as available. In one example, the neighbouring blocks to be checked in order are A1, B1.

In some embodiments, the only spatial neighboring block may be different from those used in the regular merge mode derivation process.

In some embodiments, the motion information of the first K spatial neighbouring blocks may be accessed. In one example, K is equal to 2, 3.

The checking order of spatial neighbouring blocks may be the same or different from that used in the regular merge list derivation process.

Example 2

In some embodiments, the ATMVP candidates may be derived from a temporal block identified by motion information of a spatial neighboring block of the coding unit that is not used in the regular merge list derivation process.

In some embodiments, the spatial neighboring blocks used in the ATMVP process can be totally different from those used in the regular merge list derivation process. For example, blocks B3, A2, A3 in FIG. 5 can be used.

In some embodiments, part of the spatial neighboring blocks used in the ATMVP process may be the same as those used in the regular merge list derivation process while the remaining are different. For example, blocks A1, B1, B3, A2, A3 as shown in FIG. 5 can be used.

In some embodiments, the motion information of selected spatial neighboring block(s) may be further scaled before identifying the temporal block.

Example 3

In some embodiments, instead of relying on motion information of a neighboring block, a History-based MV Prediction (HMVP) candidate fetched from a HMVP table or list can be used to derive the ATMVP candidate. History-based Motion Vector Prediction (HMVP) methods, e.g., as described in PCT/CN2018/105193 and PCT/CN2018/093987, use previously coded motion information for prediction. That is, an ATMVP candidate can be derived based on a table of motion candidates (e.g., can include ATMVP candidates and non-ATMVP candidates) derived during the video processing. The derived ATMVP candidate for the current coding unit can be used to update the table of motion candidates. For example, the derived ATMVP candidate can be added to the table after pruning is performed. Subsequent processing can be performed based on the updated table of motion candidates.

In some embodiments, scaling may be applied to the HMVP candidate.

Example 4

In some embodiments, usage of neighbouring block(s) or HMVP(s) to derive the ATMVP candidate may be adaptive.

In some embodiments, which block(s) are used may be signaled from the encoder to the decoder in VPS/SPS/PPS/slice header/tile group header/tile/CTU/CU/PU/CTU row.

Figure 9:
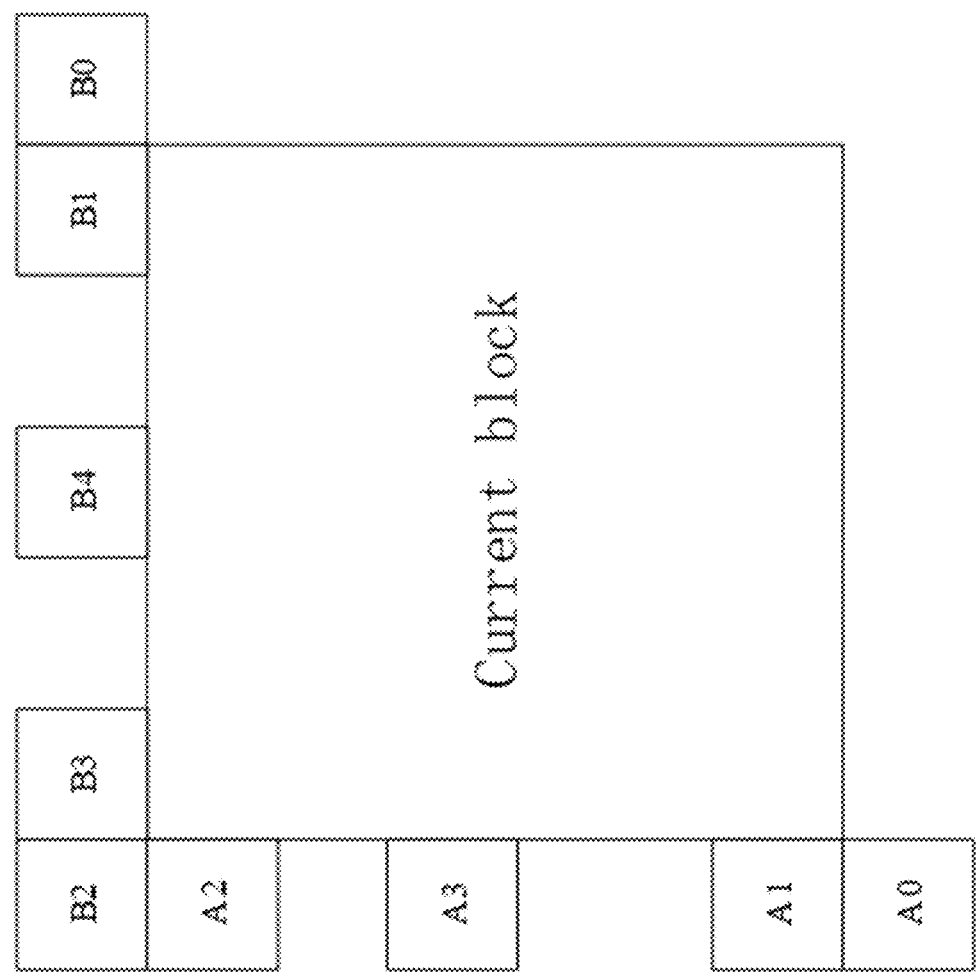
FIG. 9 shows an example of spatial neighboring blocks using for alternative temporal motion vector prediction (ATMVP) temporal block identification.

In some embodiments, which block(s) are used may depend on the width and/or height of the current block. FIG. 9 shows examples of spatial neighboring blocks used for ATMVP temporal block identification.

Example 5

When temporal block identified in the ATMVP process (such as pointed by the (scaled) motion vector from the first available merge candidate in current design or by zero motion vector) couldn't return a valid ATMVP candidate (e.g., the temporal block is intra-coded), more temporal blocks may be searched till one or multiple ATMVP candidate is found.

Figure 10:
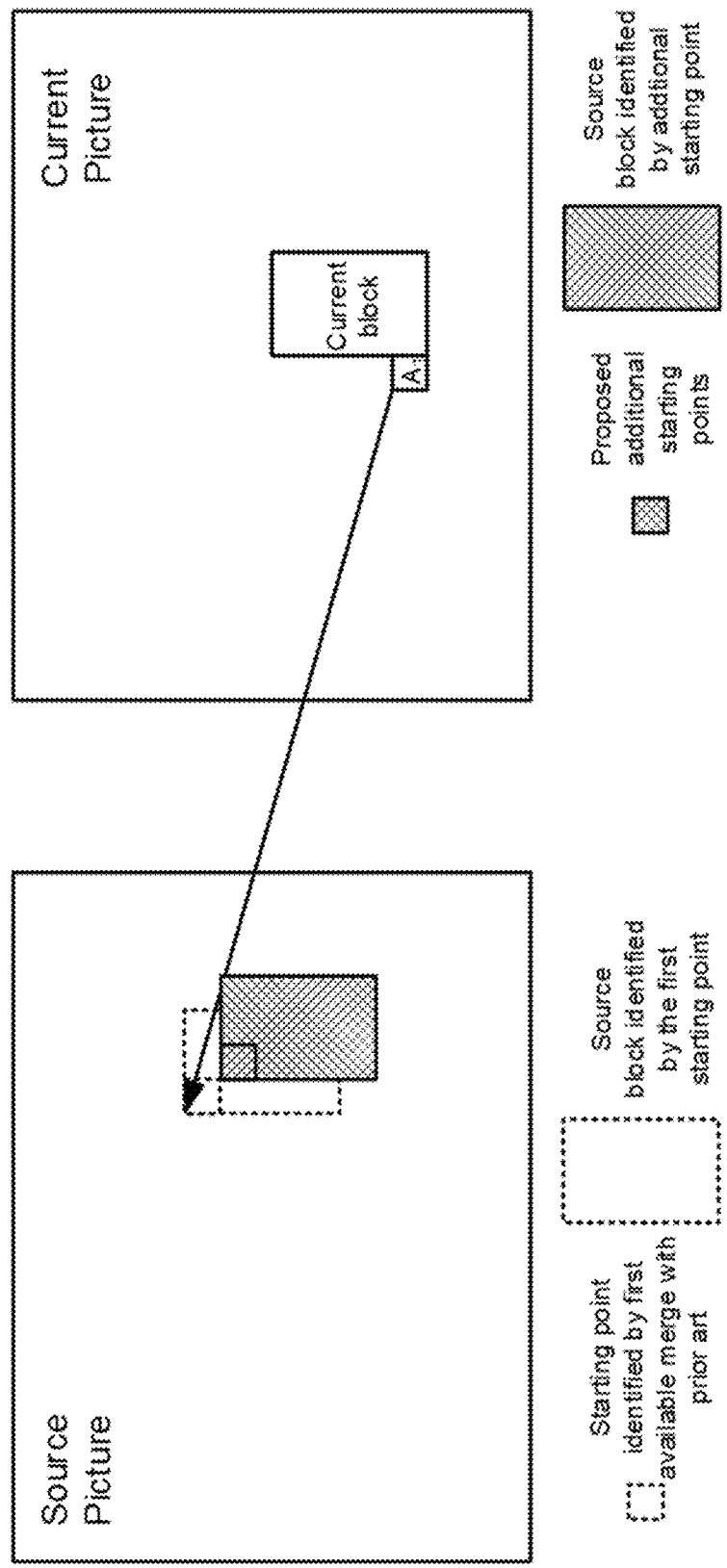
FIG. 10 shows an example of identifying an alternative starting point for ATMVP.

The bottom-right of the identified temporal block may be further checked. An example is depicted in FIG. 10. FIG. 10 shows examples of alternative starting point identified by bottom-right block of the starting point founded by prior art.

In some embodiments, a searching order may be defined, e.g., from the neighboring left, above, right, bottom of the identified temporal block; then non-adjacent left, above, right, bottom of the identified temporal block with a step, and so on.

In one example, all the temporal blocks to be checked shall be within a certain region, such as within the same CTU as the identified temporal block; or within the same CTU row of the identified temporal block.

In some embodiments, if there is no available ATMVP candidate after checking the identified temporal block and/or more temporal blocks, default ATMVP candidate may be utilized.

In one example, default ATMVP candidate may be defined as a motion candidate inherited from a spatial neighboring block. In some embodiments, the motion candidate inherited from a spatial neighboring block may be further scaled.

In some embodiments, default ATMVP candidate may be derived from the starting point MV.

i. Example 1 may be utilized to find the starting point MV.

ii. In one example, the starting point MV may be a motion vector associated with a spatial adjacent or non-adjacent or temporal block that its corresponding reference picture is the collocated reference picture.

iii. In one example, the starting point MV may be a motion vector associated with the first spatial block that its corresponding reference picture is the collocated reference picture.

iv. In one example, the starting point MV may be a zero motion vector.

v. In one example, the starting point MV may be defined in the same way as the current VVC design, that is, if the first spatial neighboring block (e.g., with checking order of A1, B1, B0, A0, B2) that is inter-coded, and its motion vectors of List X (X being 0 or 1) is pointing to the collocated picture, the starting point MV is set to the associated MV of the first spatial neighboring block for List X. otherwise, the starting point MV is set to zero motion vector.

vi. In one example, when the associated motion of the represented block identified by the starting point MV and the center position of current block is unavailable (e.g., the represented block is intra-coded or the represented block is unavailable (e.g., out of the restricted region)), the starting point MV is treated as the motion information of the represented block. In some embodiments, default motion information is derived from the starting point MV (i.e., from the motion information of the represented block).

vii. In some embodiments, furthermore, for any sub-block, if the associated motion of its represented block identified by the starting point MV and the center position of current sub-block is unavailable, the starting point MV is treated as the motion information of the represented block and utilized to derive the sub-block motion.

In one example, default ATMVP candidate may be set to zero motion vectors. In some embodiments, furthermore, the refence picture associated with the ATMVP candidate may be set to the collocated picture.

Example 6

When a motion vector is utilized to derive default motion information for the ATMVP candidate (i.e., default ATMVP candidate), a uni-prediction candidate may be derived by scaling a starting motion vector to a reference picture index within the reference picture list X. That is, the default ATMVP candidate is a uni-prediction candidate.

In one example, the reference picture index is set to 0.

In one example, the reference picture index is set to the smallest reference picture index that is corresponding to a short-term reference picture.

In one example, the reference picture index is set to the one that is used by TMVP candidate for reference picture list X.

In one example, the reference picture list X is set to List 0 or list 1.

In one example, the reference picture list X is dependent on slice/picture type and/or the reference picture list that collocated picture is from.

In one example, X is set to List (B Slice/picture ? 1−getColFromL0 Flag( ): 0). The function getColFromL0 Flag( ) returns 1 when collocated picture is from List 0; and returns 0 when collocated picture is from List 1.

Example 7

When a motion vector is utilized to derive default motion information for the ATMVP candidate (i.e., default ATMVP candidate), a bi-prediction candidate may be derived by scaling the motion vector to certain reference picture indices within two reference picture lists. That is, default ATMVP candidate is a bi-prediction candidate.

For each reference picture, a certain reference picture index is selected. In one example, it may be defined to be the same as that used for the target reference picture index (e.g., 0 in current VVC design) of TMVP candidate.

Example 8

Whether to set default motion information to uni or Bi-prediction candidate may depend on the picture/slice type. In some embodiments, it may depend on block dimension. In one example, if there are less than 64 samples, uni-prediction default motion information is utilized in the ATMVP process.

Example 9

The final merge candidate list includes at least one candidate for each motion category. A motion category can be a temporal motion vector prediction candidate category, an affine motion candidate category, or other types of categories. In some embodiments, at least one ATMVP candidate is always included in the merge candidate list. In some embodiments, at least one affine candidate is always included in the merge candidate list.

Example 10

A merge index may be assigned to a given motion category. When the merge index is known, the decoder can be ready to load information from a branch corresponding to this motion category.

For example, merge index within the range [m, n], inclusive, may correspond to ATMVP candidates. Merge index within the range [k, l], inclusive, may correspond to affine candidates. In one example, m=n=0, k=1, l>=k In some embodiments, the assigned index(s) may be adaptive. In one example, the assigned index(s) may be signaled from the encoder to the decoder in VPS/SPS/PPS/slice header/tile group header/tile/CTU/CU/PU/CTU row. In one example, the assigned index(s) may depend on the width and/or height of the current block

Example 11

When multiple ATMVP candidates are added to the merge candidate list (e.g., the sub-block merge candidate list), affine motion candidates can be added before all ATMVP candidates. In some embodiments, ATMVP candidates and affine motion candidates may be inserted in an interleaved way, i.e., one or more affine motion candidates are before an ATMVP candidate, some after.

Example 12

The order of affine motion candidates and non-affine motion candidates (e.g., ATMVP and/or STMVP candidates)

may be adaptively changed from block to block, or from tile to tile, or from picture to picture, or from sequence to sequence.

The adaptive order may depend on the neighboring blocks' coded information and/or coded information of current block. In one example, if all or majority of selected neighboring blocks are coded with affine mode, affine motion candidates may be added before other non-affine motion candidates.

The adaptive order may depend on the number of available affine motion candidates and/or number of non-affine candidates. In one example, if the ratio between number of available affine motion candidates and non-affine candidates is larger than a threshold, affine motion candidates may be inserted before non-affine motion candidates.

The adaptive order may be only applicable to the first K affine motion candidates (e.g., K is set to 1). In this case, only the first K affine motion candidates may be adaptively decided whether to be inserted before or after non-affine motion candidates.

When there are even more than 2 categories (i.e., only affine and ATMVP candidates in current design), the adaptive order of inserting different motion candidate can still be applied.

Example 13

An indication of sub-block related technologies can be signaled in picture header/PPS/slice header/tile group header. When the indication tells a sub-block related technology is disabled, there is no need to signal any related information for such a technology in block level.

In one example, an indication (such as a flag) of ATMVP at picture header/slice header/tile header may be signaled.

In one example, an indication (such as a flag) of affine at picture header/slice header/tile header may be signaled.

Example 14

The order of motion candidates for different motion categories (e.g., ATMVP, affine, STMVP) may be pre-defined or signaled in SPS/VPS/PPS/picture header/tile group header/slice etc. al.

In one example, a flag may be signaled to indicate whether affine motion candidates should be after all non-affine motion candidates.

In one example, a flag may be signaled to indicate whether ATMVP motion candidates should be before all affine motion candidates.

Example 15

It is desirable to unify the ATMVP sub-block motion derivation process and TMVP process. In one example, the sub-block motion derivation process reuses the TMVP process. In one example, the TMVP process reuse the sub-block motion derivation process.

Example 16

For the sub-block merge candidate list, the ATMVP candidate can always be available and the temporal information is disallowed to derive affine candidates. In one example, merge index to the sub-block merge candidate list equal to 0 is always corresponding to an ATMVP candidate.

In one example, merge index to the sub-block merge candidate list unequal to 0 is always corresponding to an affine candidate.

9. Additional Embodiment Examples

This section givens an embodiment that how to make ATMVP candidate always being available. The changes compared to the latest VVC specification are bold (for newly added) or italicized (for deleted).

9.1 Example #1 (a Uni-Prediction Default ATMVP Candidate to Fill in Sub-Blocks if Needed)

8.3.4.4 Derivation process for subblock-based temporal merging base motion data (note: default motion information)
Inputs to this process are:
  the location (xCtb, yCtb) of the top-left sample of the luma coding tree block that contains the current coding block,
  the location (xColCtrCb, yColCtrCb) of the top-left sample of the collocated luma coding block that covers the below-right center sample.
  the availability flags availableFlag$A_0$, availableFlag$A_1$, availableFlag$B_0$, and availableFlag$B_1$ of the neighbouring coding units,
  the reference indices refIdxLX$A_0$, refIdxLX$A_1$, refIdxLX$B_0$, and refIdxLX$B_1$ of the neighbouring coding units,
  the prediction list utilization flags predFlagLX$A_0$, predFlagLX$A_1$, predFlagLX$B_0$, and predFlagLX$B_1$ of the neighbouring coding units,
  the motion vectors in 1/16 fractional-sample accuracy mvLX$A_0$, mvLX$A_1$, mvLX$B_0$, and mvLX$B_1$ of the neighbouring coding units.
Outputs of this process are:
  the motion vectors ctrMvL0 and ctrMvL1,
  the prediction list utilization flags ctrPredFlagL0 and ctrPredFlagL1,
  the reference indices ctrRefIdxL0 and ctrRefIdxL1,
  the temporal motion vector tempMV.
The variable tempMv is set as follows:

$$tempMv[0]=0 \qquad (8\text{-}501)$$

$$tempMv[1]=0 \qquad (8\text{-}502)$$

The variable currPic specifies the current picture.
The variable availableFlagN is set equal to FALSE, and the following applies:
  When availableFlag$A_0$ is equal to 1, the following applies:
    availableFlagN is set equal to TRUE,
    refIdxLXN is set equal to refIdxLX$A_0$ and mvLXN is set equal to mvLX$A_0$, for X being replaced by 0 and 1.
  When availableFlagN is equal to FALSE and availableFlagL$B_0$ is equal to 1, the following applies:
    availableFlagN is set equal to TRUE,
    refIdxLXN is set equal to refIdxLX$B_0$ and mvLXN is set equal to mvLX$B_0$, for X being replaced by 0 and 1.
  When availableFlagN is equal to FALSE and availableFlag$B_1$ is equal to 1, the following applies:
    availableFlagN is set equal to TRUE.
    refIdxLXN is set equal to refIdxLX$B_1$ and mvLXN is set equal to mvLX$B_1$, for X being replaced by 0 and 1.

When availableFlagN is equal to FALSE and availableFlagA$_1$ is equal to 1, the following applies:
availableFlagN is set equal to TRUE.
refIdxLXN is set equal to refIdxLXA$_1$ and mvLXN is set equal to mvLXA$_1$, for X being replaced by 0 and 1.
tempMV is set to zero motion vector.
When availableFlagN is equal to TRUE, the following applies:
If all of the following conditions are true, tempMV is set equal to mvL1N:
predFlagL1N is equal to 1,
DiffPicOrderCnt(ColPic, RefPicList1[refIdxL1N]) is equal to 0,
DiffPicOrderCnt(aPic, currPic) is less than or equal to 0 for every picture aPic in every reference picture list of the current slice,
slice_type is equal to B,
collocated_from_l0_flag is equal to 0.
Otherwise if all of the following conditions are true, tempMV is set equal to mvL0N:
predFlagL0N is equal to 1,
DiffPicOrderCnt(ColPic, RefPicList0[refIdxL0N]) is equal to 0.
The location (xColCb, yColCb) of the collocated block inside ColPic is derived as follows.

$$xColCb=Clip3(xCtb,Min(CurPicWidthInSamplesY-1, xCtb+(1<<Ctb\ Log\ 2SizeY)+3),xColCtrCb+ (tempMv[0]>>4)) \quad (8\text{-}503)$$

$$yColCb=Clip3(yCtb,Min(CurPicHeightInSamplesY- 1,yCtb+(1<<Ctb\ Log\ 2SizeY)-1),yColCtrCb+ (tempMv[1]>>4)) \quad (8\text{-}504)$$

The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
Set ctrPredFlagL0=0, ctrPredFlagL1=0.
If colPredMode[xColCb][yColCb] is equal to MODE_INTER, the following applies:
The variable currCb specifies the luma coding block covering (xCtrCb, yCtrCb) inside the current picture.
The variable colCb specifies the luma coding block covering the modified location given by ((xColCb>>3)<<3, (yColCb>>3)<<3) inside the ColPic.
The luma location (xColCb, yColCb) is set equal to the top-left sample of the collocated luma coding block specified by colCb relative to the top-left luma sample of the collocated picture specified by ColPic.
The derivation process for temporal motion vector prediction in subclause 8.3.2.12 is invoked with currCb, colCb, (xColCb, yColCb), centerRefIdxL0, and sbFlag set equal to 1 as inputs and the output being assigned to ctrMvL0 and ctrPredFlagL0.
The derivation process for temporal motion vector prediction in subclause 8.3.2.12 is invoked with currCb, colCb, (xColCb, yColCb), centerRefIdxL1, and sbFlag set equal to 1 as inputs and the output being assigned to ctrMvL1 and ctrPredFlagL1.
If both ctrPredFlagL0 and ctrPredFlagL1 are equal to 0, the following applies:
Set target reference picture list index X=slice.isInterB( )?1-slice.getColFromL0 Flag( ): 0

Scale tempMV to reference picture list X and reference picture index equal to 0 and set ctrMvLX to the scaled tempMV.
ctrPredFlagLX=1.
Otherwise, the following applies:

$$ctrPredFlagL0=0 \quad (8\text{-}505)$$

$$ctrPredFlagL1=0 \quad (8\text{-}506)$$

Example #2 (a Bi-Prediction Default ATMVP Candidate to Fill in Sub-Blocks if Needed)

8.3.4.4 Derivation process for subblock-based temporal merging base motion data (note: default motion information)
Inputs to this process are:
the location (xCtb, yCtb) of the top-left sample of the luma coding tree block that contains the current coding block,
the location (xColCtrCb, yColCtrCb) of the top-left sample of the collocated luma coding block that covers the below-right center sample.
the availability flags availableFlagA$_0$, availableFlagA$_1$, availableFlagB$_0$, and availableFlagB$_1$ of the neighbouring coding units,
the reference indices refIdxLXA$_0$, refIdxLXA$_1$, refIdxLXB$_0$, and refIdxLXB$_1$ of the neighbouring coding units,
the prediction list utilization flags predFlagLXA$_0$, predFlagLXA$_1$, predFlagLXB$_0$, and predFlagLXB$_1$ of the neighbouring coding units,
the motion vectors in 1/16 fractional-sample accuracy mvLXA$_0$, mvLXA$_1$, mvLXB$_0$, and mvLXB$_1$ of the neighbouring coding units.
Outputs of this process are:
the motion vectors ctrMvL0 and ctrMvL1,
the prediction list utilization flags ctrPredFlagL0 and ctrPredFlagL1,
the reference indices ctrRefIdxL0 and ctrRefIdxL1,
the temporal motion vector tempMV.
The variable tempMv is set as follows:

$$tempMv[0]=0 \quad (8\text{-}501)$$

$$tempMv[1]=0 \quad (8\text{-}502)$$

The variable currPic specifies the current picture.
The variable availableFlagN is set equal to FALSE, and the following applies:
When availableFlagA$_0$ is equal to 1, the following applies:
availableFlagN is set equal to TRUE,
refIdxLXN is set equal to refIdxLXA$_0$ and mvLXN is set equal to mvLXA$_0$, for X being replaced by 0 and 1.
When availableFlagN is equal to FALSE and availableFlagLB$_0$ is equal to 1, the following applies:
availableFlagN is set equal to TRUE,
refIdxLXN is set equal to refIdxLXB$_0$ and mvLXN is set equal to mvLXB$_0$, for X being replaced by 0 and 1.
When availableFlagN is equal to FALSE and availableFlagB$_1$ is equal to 1, the following applies:
availableFlagN is set equal to TRUE.
refIdxLXN is set equal to refIdxLXB$_1$ and mvLXN is set equal to mvLXB$_1$, for X being replaced by 0 and 1.

When availableFlagN is equal to FALSE and availableFlag$A_1$ is equal to 1, the following applies:
availableFlagN is set equal to TRUE.
refIdxLXN is set equal to refIdxLX$A_1$ and mvLXN is set equal to mvLX$A_1$, for X being replaced by 0 and 1.
tempMV is set to zero motion vector.
When availableFlagN is equal to TRUE, the following applies:
If all of the following conditions are true, tempMV is set equal to mvL1N:
predFlagL1N is equal to 1,
DiffPicOrderCnt(ColPic, RefPicList1[refIdxL1N]) is equal to 0,
DiffPicOrderCnt(aPic, currPic) is less than or equal to 0 for every picture aPic in every reference picture list of the current slice,
slice_type is equal to B,
collocated_from_l0_flag is equal to 0.
Otherwise if all of the following conditions are true, tempMV is set equal to mvL0N:
predFlagL0N is equal to 1,
DiffPicOrderCnt(ColPic, RefPicList0[refIdxL0N]) is equal to 0.
The location (xColCb, yColCb) of the collocated block inside ColPic is derived as follows.

xColCb=Clip3(xCtb,Min(CurPicWidthInSamples$Y$-1, xCtb+(1<<Ctb Log 2Size$Y$)+3),xColCtrCb+ (tempMv[0]>>4))     (8-503)

yColCb=Clip3(yCtb,Min(CurPicHeightInSamples$Y$-1,yCtb+(1<<Ctb Log 2Size$Y$)-1),yColCtrCb+ (tempMv[1]>>4))     (8-504)

The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
Set ctrPredFlagL0=0, ctrPredFlagL1=0.
If colPredMode[xColCb][yColCb] is equal to MODE_INTER, the following applies:
The variable currCb specifies the luma coding block covering (xCtrCb, yCtrCb) inside the current picture.
The variable colCb specifies the luma coding block covering the modified location given by ((xColCb>>3)<<3, (yColCb>>3)<<3) inside the ColPic.
The luma location (xColCb, yColCb) is set equal to the top-left sample of the collocated luma coding block specified by colCb relative to the top-left luma sample of the collocated picture specified by ColPic.
The derivation process for temporal motion vector prediction in subclause 8.3.2.12 is invoked with currCb, colCb, (xColCb, yColCb), centerRefIdxL0, and sbFlag set equal to 1 as inputs and the output being assigned to ctrMvL0 and ctrPredFlagL0.
The derivation process for temporal motion vector prediction in subclause 8.3.2.12 is invoked with currCb, colCb, (xColCb, yColCb), centerRefIdxL1, and sbFlag set equal to 1 as inputs and the output being assigned to ctrMvL1 and ctrPredFlagL1.

If both ctrPredFlagL0 and ctrPredFlagL1 are equal to 0, the following applies:
Set target reference picture list index X=0
Scale tempMV to reference picture list X and reference picture index equal to 0 and set ctrMvLX to the scaled tempMV.
ctrPredFlagLX=1.
If current slice/picture is B slice,
1. set target reference picture list index X=1
2. Scale tempMV to reference picture list X and reference picture index equal to 0 and set ctrMvLX to the scaled tempMV.
3. ctrPredFlagLX=1.
Otherwise, the following applies:

ctrPredFlag$L$0=0     (8-505)

ctrPredFlag$L$1=0     (8-506)

Example 3: ATMVP Candidate Starting Point MV from One Spatial Block 8.3.4.4 Derivation process for subblock-based temporal merging base motion data (note: default motion information)
Inputs to this process are:
the location (xCtb, yCtb) of the top-left sample of the luma coding tree block that contains the current coding block,
the location (xColCtrCb, yColCtrCb) of the top-left sample of the collocated luma coding block that covers the below-right center sample.
the availability flags availableFlag$A_0$, availableFlag$A_1$, availableFlag$B_0$, and availableFlag$B_1$ of the neighbouring coding units,
the reference indices refIdxLX$A_0$, refIdxLX$A_1$, refIdxLX$B_0$, and refIdxLX$B_1$ of the neighbouring coding units,
the prediction list utilization flags predFlagLX$A_0$, predFlagLX$A_1$, predFlagLX$B_0$, and predFlagLX$B_1$ of the neighbouring coding units,
the motion vectors in 1/16 fractional-sample accuracy mvLX$A_0$, mvLX$A_1$, mvLX$B_0$, and mvLX$B_1$ of the neighbouring coding units.
Outputs of this process are:
the motion vectors ctrMvL0 and ctrMvL1,
the prediction list utilization flags ctrPredFlagL0 and ctrPredFlagL1,
the reference indices ctrRefIdxL0 and ctrRefIdxL1,
the temporal motion vector tempMV.
The variable tempMv is set as follows:

tempMv[0]=0     (8-501)

tempMv[1]=0     (8-502)

The variable currPic specifies the current picture.
The variable availableFlagN is set equal to FALSE, and the following applies:
When availableFlag$A_0$ is equal to 1, the following applies:
availableFlagN is set equal to TRUE,
refIdxLXN is set equal to refIdxLX$A_0$ and mvLXN is set equal to mvLX$A_0$, for X being replaced by 0 and 1.

When availableFlagN is equal to FALSE and availableFlagLB$_0$ is equal to 1, the following applies:
availableFlagN is set equal to TRUE,
refIdxLXN is set equal to refIdxLXB$_0$ and mvLXN is set equal to mvLXB$_0$, for X being replaced by 0 and 1.

When availableFlagN is equal to FALSE and availableFlagB$_1$ is equal to 1, the following applies:
availableFlagN is set equal to TRUE.
refIdxLXN is set equal to refIdxLXB$_1$ and mvLXN is set equal to mvLXB$_1$, for X being replaced by 0 and 1.

When availableFlagN is equal to FALSE and availableFlagA$_1$ is equal to 1, the following applies:
availableFlagN is set equal to TRUE.
refIdxLXN is set equal to refIdxLXA$_1$ and mvLXN is set equal to mvLXA$_1$, for X being replaced by 0 and 1.

When availableFlagN is equal to TRUE, the following applies:

Example #4 (Alignment of Sub-Block and TMVP Process)

8.3.4.4 Derivation process for subblock-based temporal merging base motion data
Inputs to this process are:
  the location (xCtb, yCtb) of the top-left sample of the luma coding tree block that contains the current coding block,
  the location (xColCtrCb, yColCtrCb) of the top-left sample of the collocated luma coding block that covers the below-right center sample.
  the availability flags availableFlagA$_0$, availableFlagA$_1$, availableFlagB$_0$, and availableFlagB$_1$ of the neighbouring coding units,
  the reference indices refIdxLXA$_0$, refIdxLXA$_1$, refIdxLXB$_0$, and refIdxLXB$_1$ of the neighbouring coding units,
  the prediction list utilization flags predFlagLXA$_0$, predFlagLXA$_1$, predFlagLXB$_0$, and predFlagLXB$_1$ of the neighbouring coding units,
  the motion vectors in 1/16 fractional-sample accuracy mvLXA$_0$, mvLXA$_1$, mvLXB$_0$, and mvLXB$_1$ of the neighbouring coding units.
Outputs of this process are:
  the motion vectors ctrMvL0 and ctrMvL1,
  the prediction list utilization flags ctrPredFlagL0 and ctrPredFlagL1,
  the reference indices ctrRefIdxL0 and ctrRefIdxL1,
  the temporal motion vector tempMV.
The variable tempMv is set as follows:

$$\text{tempMv}[0]=0 \qquad (8\text{-}501)$$

$$\text{tempMv}[1]=0 \qquad (8\text{-}502)$$

The variable currPic specifies the current picture.
The variable availableFlagN is set equal to FALSE, and the following applies:
. . .
  When availableFlagN is equal to TRUE, the following applies:
    If all of the following conditions are true, tempMV is set equal to mvL1N:
      predFlagL1N is equal to 1,
      DiffPicOrderCnt(ColPic, RefPicList1[refIdxL1N]) is equal to 0,
      DiffPicOrderCnt(aPic, currPic) is less than or equal to 0 for every picture aPic in every reference picture list of the current slice,
      slice_type is equal to B,
      collocated_from_l0_flag is equal to 0.
    Otherwise if all of the following conditions are true, tempMV is set equal to mvL0N:
      predFlagL0N is equal to 1,
      DiffPicOrderCnt(ColPic, RefPicList0[refIdxL0N]) is equal to 0.
The location (xColCb, yColCb) of the collocated block inside ColPic is derived as follows.

$$xColCb = Clip3(xCtb, Min(CurPicWidthInSamplesY-1, xCtb+(1<<Ctb\,Log\,2SizeY)+3), xColCtrCb+ (tempMv[0]>>4)) \qquad (8\text{-}503)$$

$$yColCb = Clip3(yCtb, Min(CurPicHeightInSamplesY-1, yCtb+(1<<Ctb\,Log\,2SizeY)-1), yColCtrCb+ (tempMv[1]>>4)) \qquad (8\text{-}504)$$

The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
  If colPredMode[xColCb][yColCb] is equal to MODE_INTER, the following applies:
    The variable currCb specifies the luma coding block covering (xCtrCb, yCtrCb) inside the current picture.
    The variable colCb specifies the luma coding block covering the modified location given by ((xColCb>>3)<<3, (yColCb>>3)<<3) inside the ColPic.
    The luma location (xColCb, yColCb) is set equal to the top-left sample of the collocated luma coding block specified by colCb relative to the top-left luma sample of the collocated picture specified by ColPic.
    The derivation process for temporal motion vector prediction in subclause 8.3.2.12 is invoked with currCb, colCb, (xColCb, yColCb), centerRefIdxL0, and sbFlag set equal to 1 as inputs and the output being assigned to ctrMvL0 and ctrPredFlagL0.
    The derivation process for temporal motion vector prediction in subclause 8.3.2.12 is invoked with currCb, colCb, (xColCb, yColCb), centerRefIdxL1, and sbFlag set equal to 1 as inputs and the output being assigned to ctrMvL1 and ctrPredFlagL1.
  Otherwise, the following applies:

$$\text{ctrPredFlag}L0=0 \qquad (8\text{-}505)$$

$$\text{ctrPredFlag}L1=0 \qquad (8\text{-}506)$$

8.3.2.11 Derivation process for temporal luma motion vector prediction
Inputs to this process are:
. . .
Outputs of this process are:
  the motion vector prediction mvLXCol in 1/16 fractional-sample accuracy,
  the availability flag availableFlagLXCol.
The variable currCb specifies the current luma coding block at luma location (xCb, yCb).
The variables mvLXCol and availableFlagLXCol are derived as follows:
  If slice_temporal_mvp_enabled_flag is equal to 0, both components of mvLXCol are set equal to 0 and availableFlagLXCol is set equal to 0.

Otherwise (slice_temporal_mvp_enabled_flag is equal to 1), the following ordered steps apply:
1. The bottom right collocated motion vector is derived as follows:

$$xColBr = xCb + cbWidth \quad (8\text{-}330)$$

$$yColBr = yCb + cbHeight \quad (8\text{-}331)$$

If yCb>>CtbLog 2SizeY is equal to yColBr>>CtbLog 2SizeY, yColBr is less than pic_height_in_luma_samples and xColBr is less than pic_width_in_luma_samples, the following applies:
The variable colCb specifies the luma coding block covering the modified location given by ((xColBr>>3)<<3, (yColBr>>3)<<3) inside the collocated picture specified by ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.3.2.12 is invoked with currCb, colCb, (xColCb, yColCb), refIdxLX and sbFlag set equal to 0 as inputs, and the output is assigned to mvLXCol and availableFlagLXCol.
Otherwise, both components of mvLXCol are set equal to 0 and availableFlagLXCol is set equal to 0.
2. When availableFlagLXCol is equal to 0, the central collocated motion vector is derived as follows:

$$xColCtr = xCb + (cbWidth >> 1) \quad (8\text{-}332)$$

$$yColCtr = yCb + (cbHeight >> 1) \quad (8\text{-}333)$$

The variable colCb specifies the luma coding block covering the modified location given by ((xColCtr>>3)<<3, (yColCtr>>3)<<3) inside the collocated picture specified by ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.3.2.12 is invoked with currCb, colCb, (xColCb, yColCb), refIdxLX and sbFlag set equal to 0 as inputs, and the output is assigned to mvLXCol and availableFlagLXCol.

Figure 11:
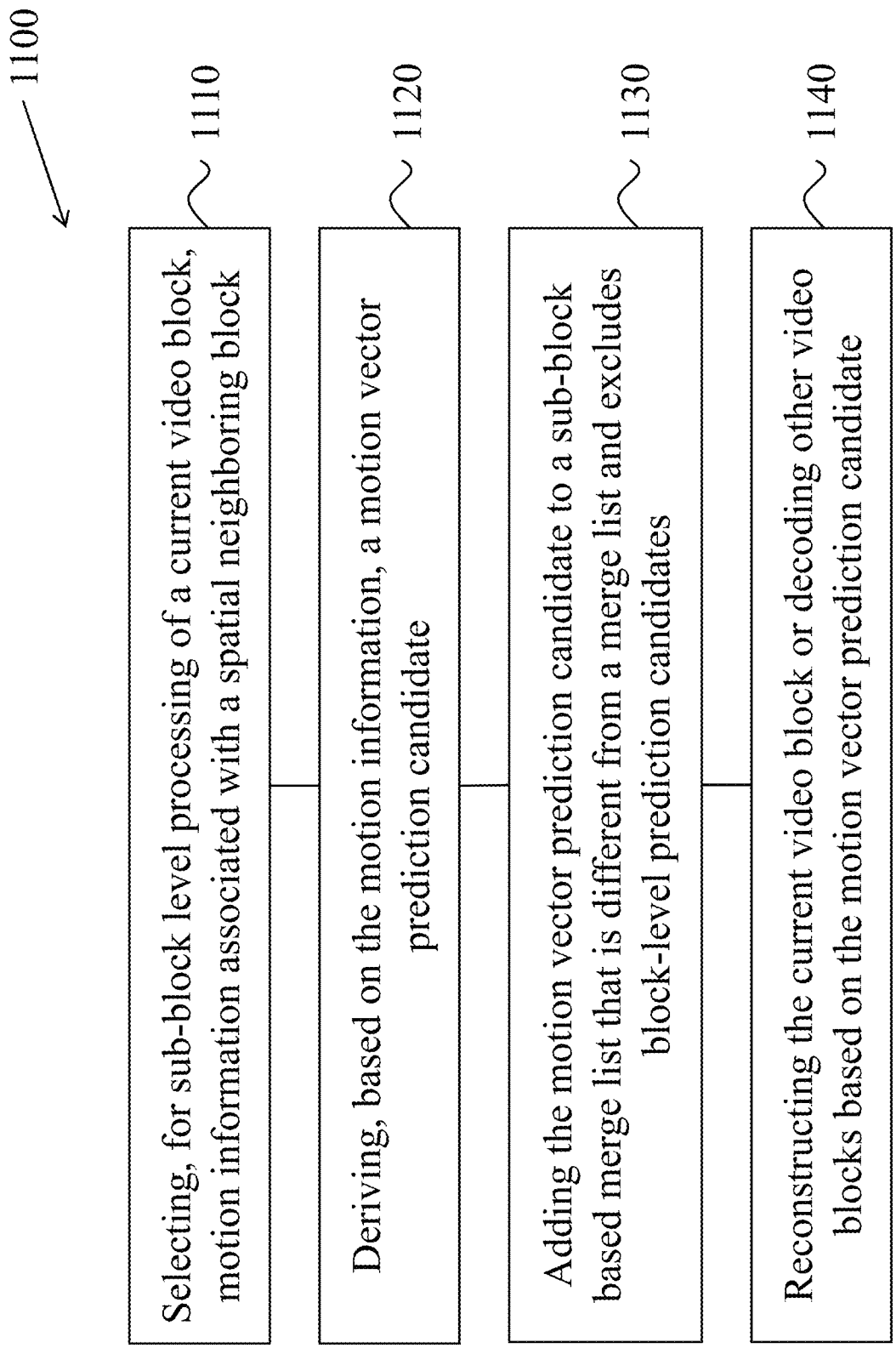
FIG. 11 shows a flowchart of an example method for video coding in accordance with the disclosed technology.

8.3.2.12 Derivation process for collocated motion vectors
Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.
Outputs of this process are:
  the motion vector prediction mvLXCol in 1/16 fractional-sample accuracy,
  the availability flag availableFlagLXCol.
The variable currPic specifies the current picture.
The arrays predFlagL0Col[x][y], mvL0Col[x][y] and refIdxL0Col[x][y] are set equal to PredFlagL0[x][y], MvL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvL1[x][y] and RefIdxL1[x][y], respectively, of the collocated picture specified by ColPic.
The variables mvLXCol and availableFlagLXCol are derived as follows:
  If colCb is coded in an intra prediction mode, both components of mvLXCol are set equal to 0 and availableFlagLXCol is set equal to 0.
  Otherwise, the motion vector mvCol, the reference index refIdxCol and the reference list identifier listCol are derived as follows:
    If sbFlag is equal to 0, availableFlagLXCol is set to 1 and the following applies:
      If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
      Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.
      Otherwise (predFlagL0Col[xColCb][yColCb] is equal to 1 and predFlagL1Col[xColCb][yColCb] is equal to 1), the following assignments are made:
        If NoBackwardPredFlag is equal to 1, mvCol, refIdxCol and listCol are set equal to mvLXCol[xColCb][yColCb], refIdxLXCol[xColCb][yColCb] and LX, respectively.
        Otherwise, mvCol, refIdxCol and listCol are set equal to mvLNCol[xColCb][yColCb], refIdxLNCol[xColCb][yColCb] and LN, respectively, with N being the value of collocated_from_l0_flag.
    Otherwise (sbFlag is equal to 1), the following applies:
      If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.
      Otherwise (PredFlagLXCol[xColCb][yColCb] is equal to 0), the following applies:
        If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.
        Both the components of mvLXCol are set to 0 and availableFlagLXCol is set equal to 0.
When availableFlagLXCol is equal to TRUE, mvLXCol and availableFlagLXCol are derived as follows:
  . . . (remaining details similar to the current version of VVC specification).
The examples described above may be incorporated in the context of the methods described below, e.g., methods 1100, 1200 and 1300, which may be implemented at a video decoder and/or video encoder.
FIG. 11 shows a flowchart of an example method for video processing. The method 1100 includes, at step 1110, selecting, for sub-block level processing of a current video block, motion information associated with a spatial neighboring block.

In some embodiments, and in the context of Example 1, the spatial neighboring block is a first spatial neighboring block that is checked in the sub-block based merge list.

In some embodiments, and in the context of Example 4, selecting the spatial neighboring block is based on signaling in a video parameter set (VPS), a sequence parameter set (SPS), a picture parameter set (PPS), a slice header, a tile group header, a coding tree unit (CTU), a tile, a coding unit (CU), a prediction unit (PU) or a CTU row. In other embodiments, selecting the spatial neighboring block is based on a height or a width of the current video block.

The method 1100 includes, at step 1120, deriving, based on the motion information, a motion vector prediction candidate.

In some embodiments, and in the context of Example 2, deriving the motion vector prediction candidate includes the steps of identifying, based on the motion information, a temporal neighboring block, and deriving the motion vector prediction candidate based on the temporal neighboring block. In some embodiments, the motion information is scaled prior to the identifying the temporal neighboring block.

In some embodiments, and in the context of Example 2, the identifying the temporal neighboring block includes the steps of performing a sequential multi-step search over each of a plurality of temporal neighboring blocks, and terminating the sequential multi-step search upon identifying a first of the plurality of temporal neighboring blocks that returns at least one valid motion vector prediction candidate. In one example, the sequential multi-step search is over one or more temporal blocks in a coding tree unit (CTU) that comprises the identified temporal neighboring block. In another example, the sequential multi-step search is over one or more temporal blocks in a single row of a coding tree unit (CTU) that comprises the identified temporal neighboring block.

In some embodiments, and in the context of Example 3, the motion information is replaced by a history-based motion vector prediction (HMVP) candidate prior to deriving the motion vector prediction candidate. In an example, the HMVP candidate is scaled prior to deriving the motion vector prediction candidate.

The method 1100 includes, at step 1130, adding the motion vector prediction candidate to a sub-block based merge list that is different from a merge list and excludes block-level prediction candidates.

The method 1100 includes, at step 1140, reconstructing the current video block or decoding other video blocks based on the motion vector prediction candidate.

Figure 12:
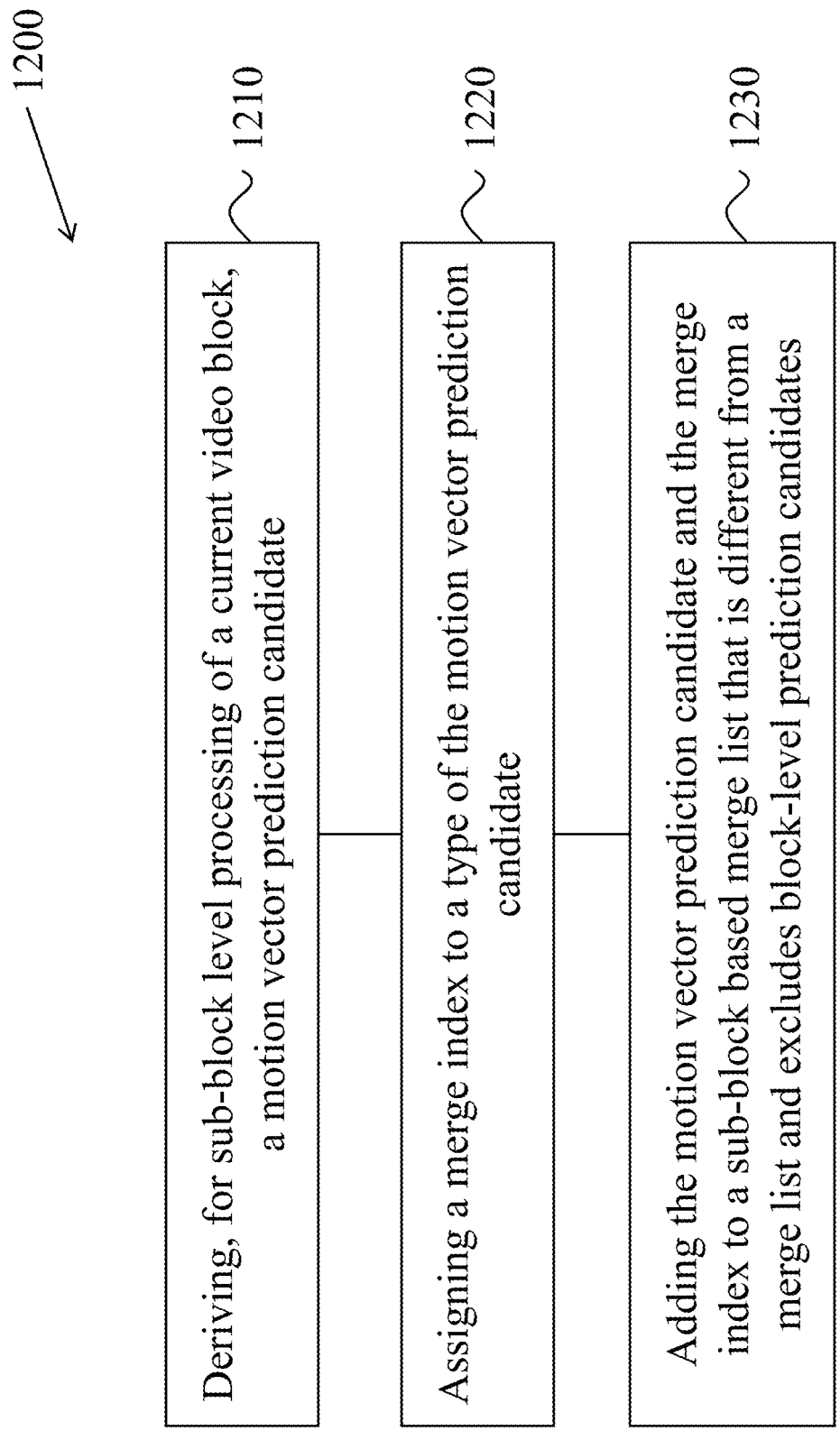
FIG. 12 shows a flowchart of another example method for video coding in accordance with the disclosed technology.

FIG. 12 shows a flowchart of an example method for video processing. The method 1200 includes, at step 1210, deriving, for sub-block level processing of a current video block, a motion vector prediction candidate.

The method 1200 includes, at step 1220, assigning a merge index to a type of the motion vector prediction candidate.

The method 1200 includes, at step 1230, adding the motion vector prediction candidate and the merge index to a sub-block based merge list that is different from a merge list and excludes block-level prediction candidates.

In some embodiments, and in the context of Example 7, the method 1200 further includes the steps of determining the type of motion information associated with the current video block, and reconstructing the current video block or decoding other video blocks based on one or more motion vector prediction candidates from the sub-block based merge list, wherein the one or more motion vector prediction candidates are selected based on the type. In one example, the merge index within a first range corresponds to one or more alternative temporal motion vector prediction (ATMVP) candidates. In another example, the merge index within a second range corresponds to one or more affine candidates. In yet another example, the merge index is based on signaling in a video parameter set (VPS), a sequence parameter set (SPS), a picture parameter set (PPS), a slice header, a tile group header, a coding tree unit (CTU), a tile, a coding unit (CU), a prediction unit (PU) or a CTU row. In yet another example, the type of the motion vector prediction candidate is an affine motion vector prediction candidate, an alternative temporal motion vector prediction (ATMVP) candidate or a spatial-temporal motion vector prediction (STMVP) candidate.

In some embodiments, and in the context of Example 8, adding the motion vector prediction candidate to the sub-block based merge list is based on an adaptive ordering. In one example, one or more alternative temporal motion vector prediction (ATMVP) candidates are added to the sub-block based merge list prior to any affine motion vector prediction candidates. In another example, one or more affine motion vector prediction candidates are added to the sub-block based merge list prior to any alternative temporal motion vector prediction (ATMVP) candidates.

Figure 13:
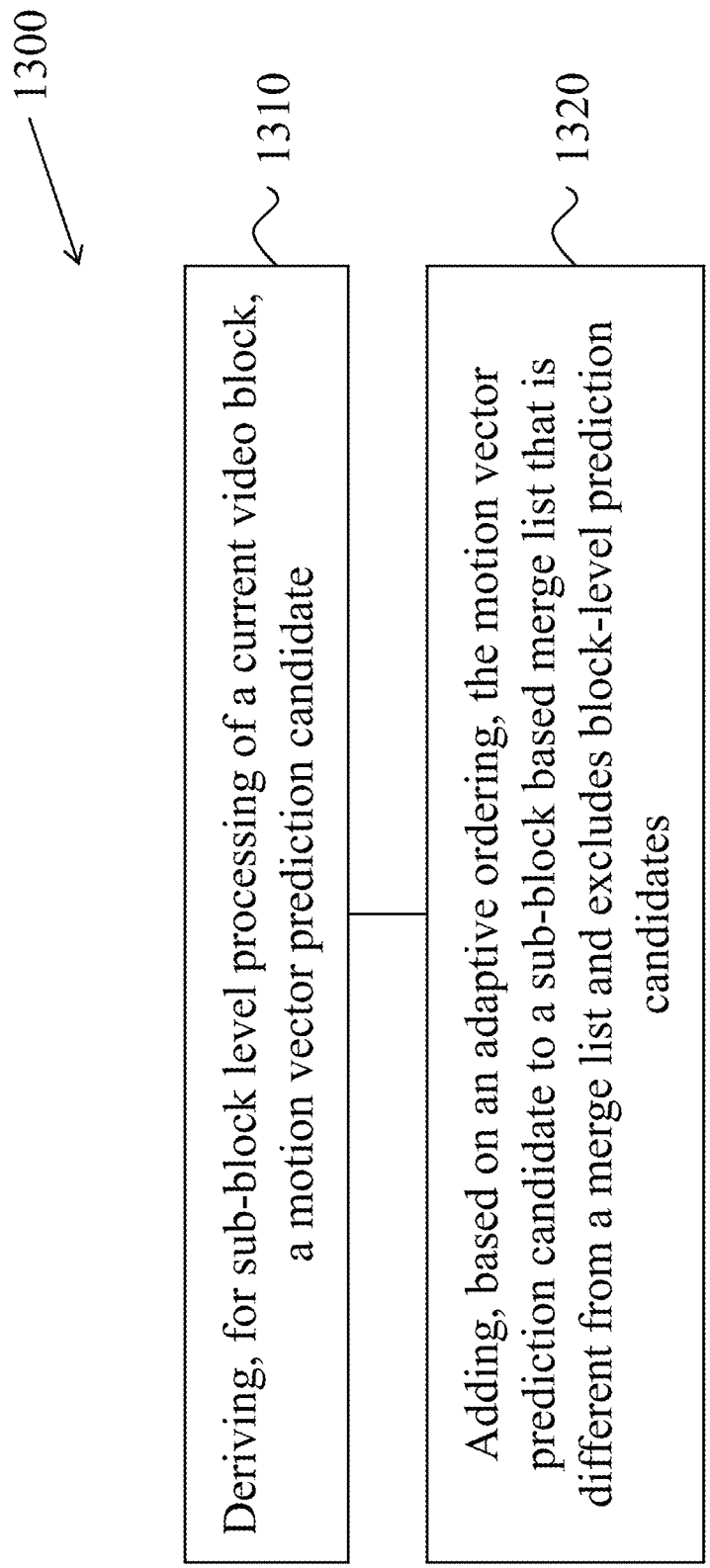
FIG. 13 shows a flowchart of yet another example method for video coding in accordance with the disclosed technology.

FIG. 13 shows a flowchart of an example method for video processing. The method 1300 includes, at step 1310, deriving, for sub-block level processing of a current video block, a motion vector prediction candidate.

The method 1300 includes, at step 1320, adding, based on an adaptive ordering, the motion vector prediction candidate to a sub-block based merge list that is different from a merge list and excludes block-level prediction candidates.

In some embodiments, and in the context of Example 9, the adaptive ordering is based on coded information of the current block. In other embodiments, the adaptive ordering is based on coded information of one or more neighboring blocks of the current block. In yet other embodiments, the adaptive ordering is based on signaling in a video parameter set (VPS), a sequence parameter set (SPS), a picture parameter set (PPS), a slice header, a tile group header, a coding tree unit (CTU), a tile, a coding unit (CU), a prediction unit (PU) or a CTU row. In yet other embodiments, the adaptive ordering is based on a first number of available affine motion vector prediction candidates and/or a second number of available non-affine motion vector prediction candidates.

In some embodiments, e.g., as disclosed in Items 6-8 and 15-16 in section 8, an example video processing method includes determining a default motion candidate for a sub-block based coding mode for a conversion between a current video block and a bitstream representation of the current video block using one of the following: (a) a uni-prediction candidate that is derived by scaling a starting motion candidate to a reference picture index within a reference picture list X; or (b) a bi-prediction candidate that is derived by scaling to reference picture indexes within two reference picture lists; or (c) candidate in either (a) or (b) depending on a picture type or a slice type of the current video block; or (d) a candidate derived for a temporal motion vector predictor (TMVP) process of the current video block. For example, under option (a), the starting motion vector could be a motion vector that is associated with a block pointing to a collocated picture or the first spatially neighboring block that has a motion vector pointing to a collocated picture or a zero motion vector or another choice of motion vector. Additional features and implementation options are described in Section 8, items 6-8 and 15-16.

9. Example Implementations of the Disclosed Technology

Figure 14:
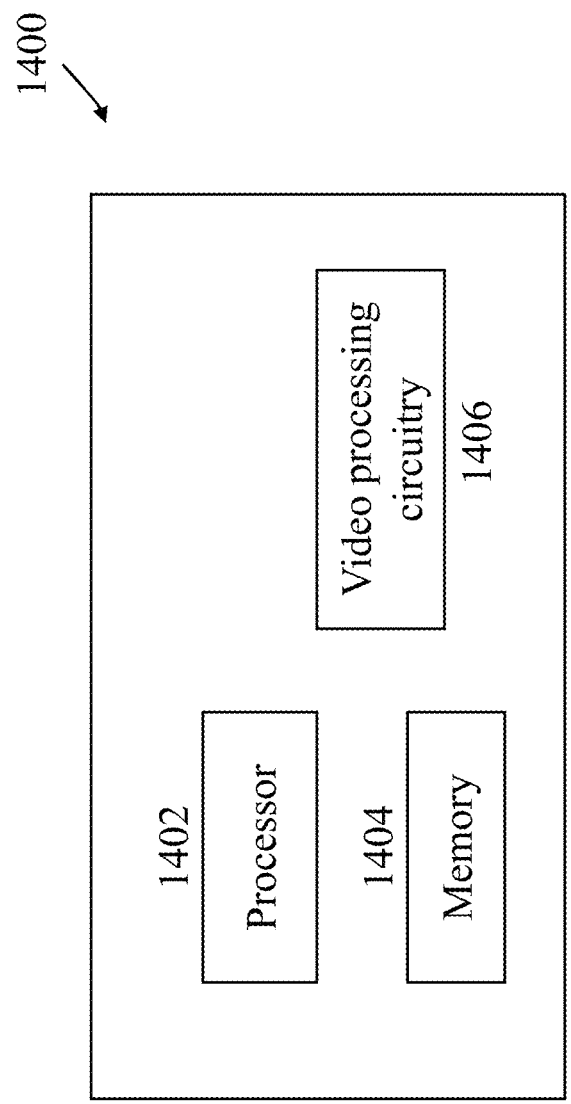
FIG. 14 is a block diagram of an example of a hardware platform for implementing a visual media decoding or a visual media encoding technique described in the present document.

FIG. 14 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods (including, but not limited to, methods 1100, 1200 and 1300) described in the present document. The memory (memories) 1404 may be used for storing data and code used for implementing the methods and techniques described herein. The video processing hardware 1406 may be used to implement, in hardware circuitry, some techniques described in the present document.

Figure 16:
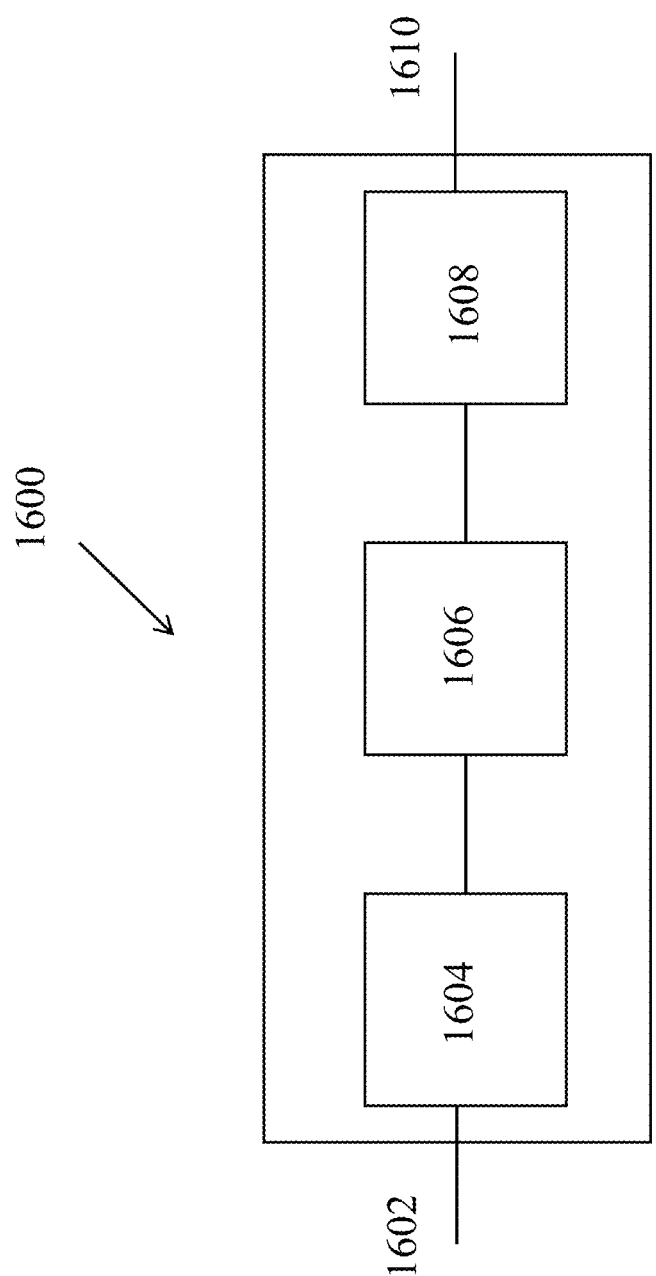
FIG. 16 is a block diagram of an example video processing system in which disclosed techniques may be implemented.

FIG. 16 is a block diagram showing an example video processing system 1600 in which various techniques disclosed herein may be implemented. Various implementations may include some or all of the components of the system 1600. The system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 17:
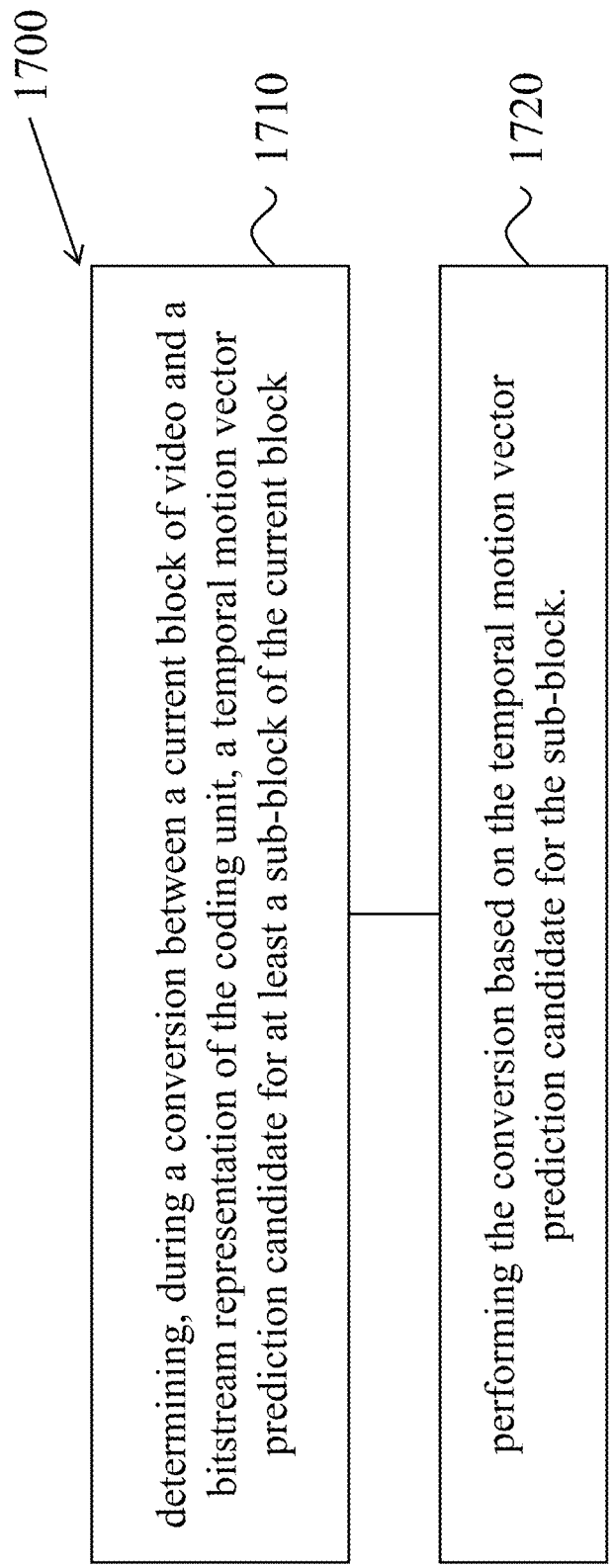
FIG. 17 is a flowchart representation of a method for video processing in accordance with the present disclosure.

FIG. 17 is a flowchart representation of a method 1700 for video processing in accordance with the present disclosure. The method 1700 includes, at operation 1710, determining, during a conversion between a current block of a video and a bitstream representation of the video, a temporal motion vector prediction candidate for at least a sub-block of the current block. The temporal motion vector prediction candidate is determined based on K neighboring blocks of the current block, K being a positive integer. The method 1700 includes, at operation 1720, performing the conversion based on the temporal motion vector prediction candidate for the sub-block.

In some embodiments, the temporal motion vector prediction candidate is completely determined based on K neighboring blocks of the current block. In some embodiments, K=1. In some embodiments, K=2 or 3. In some embodiments, the temporal motion vector prediction candidate is determined without checking all motion candidates in a merge list of the current block. In some embodiments, one of the K spatial neighboring blocks is same as a first spatial neighboring block checked in a merge list construction process of a video block. In some embodiments, a spatial neighboring block of the video block is adjacent to a bottom-left corner of the current block. In some embodiments, at least one of the K spatial neighboring blocks is different from spatial neighboring blocks checked in in a merge list construction process of a video block. In some embodiments, the K spatial neighboring blocks are determined by checking a plurality of available spatial neighboring blocks in a first order.

In some embodiments, the method further includes determining that a spatial neighboring block is available in case the spatial neighboring block is coded prior to performing the conversion of the current block. In some embodiments, the spatial neighboring block is within a same tile as the current block. In some embodiments, the plurality of available spatial neighboring blocks includes a first block adjacent to a bottom-left corner of the current block and a second block adjacent to a top-right corner of the current block. In some embodiments, the method includes checking the K spatial neighboring blocks of the current block in a first order, wherein spatial neighboring blocks in a block-based merge list construction process of a video block are checked in a second order, the second order being different than the first order. In some embodiments, K is equal to 1, and the first order indicates that a first spatial neighboring block adjacent to a bottom-left corner of the current block is to be checked while the second order indicates that a second spatial neighboring block adjacent to an above-right corner of a video block is to be checked.

In some embodiments, the temporal motion vector prediction includes an Alternative Temporal Motion Vector Prediction (ATMVP) candidate. In some embodiments, the method includes identifying a temporal block according to motion information of the K spatial neighboring blocks and deriving motion information of the sub-block based on the motion information of the identified temporal block. In some embodiments, the method further includes identifying a second video block in a different picture according to motion information of the K neighboring blocks and deriving temporal motion information of a sub-block based on the second video block. In some embodiments, a sub-block size is 8×8. In some embodiments, a sub-block size is same as a block size.

In some embodiments, the conversion comprises encoding the current block to generate the bitstream representation. In some embodiments, the conversion comprises decoding the bitstream representation to generate the current block.

Figure 18:
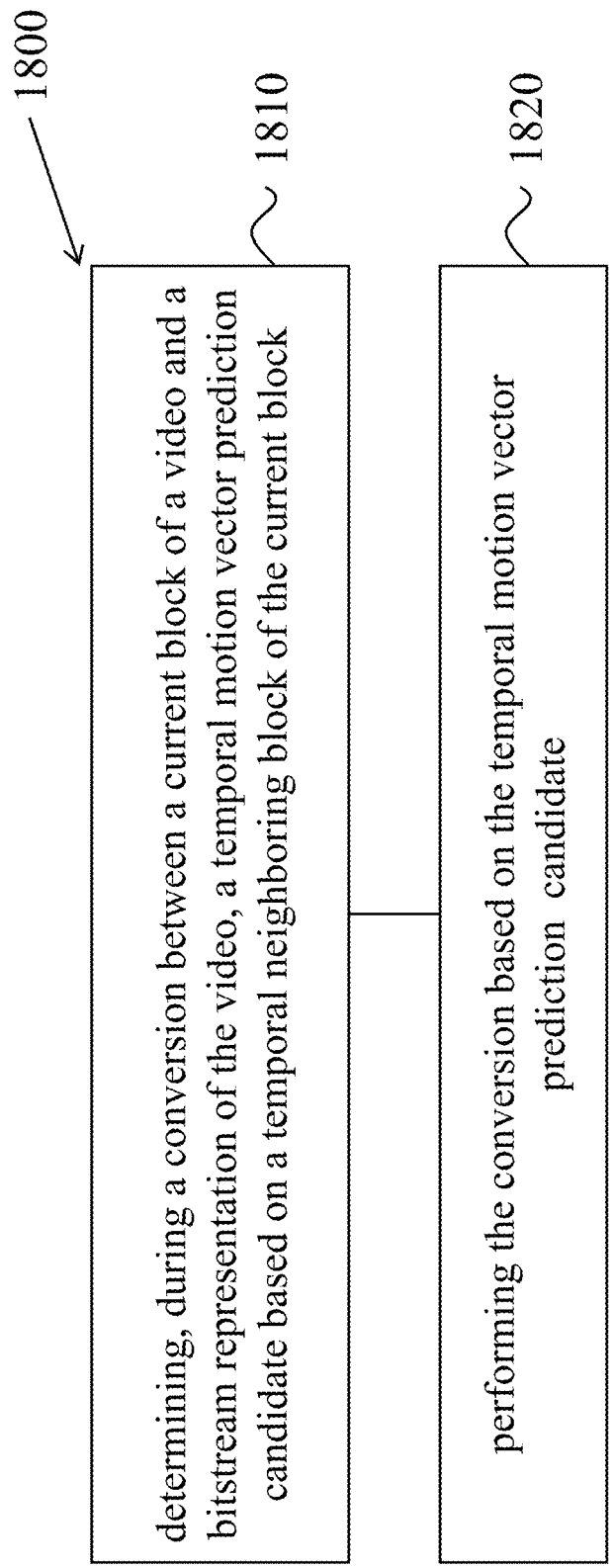
FIG. 18 is a flowchart representation of another method for video processing in accordance with the present disclosure.

FIG. 18 is a flowchart representation of a method 1800 for video processing in accordance with the present disclosure. The method 1800 includes, at operation 1810, determining, during a conversion between a current block of a video and a bitstream representation of the video, a temporal motion vector prediction candidate based on a temporal neighboring block of the current block. The temporal neighboring block is identified based on motion information of a spatial neighboring block selected from one or more spatial neighboring blocks that are different from at least one spatial neighboring block used in a merge list construction process of a video block. The method 1800 also includes, at operation 1820, performing the conversion based on the temporal motion vector prediction candidate.

In some embodiments, the temporal motion vector prediction candidate includes an Alternative Temporal Motion Vector Prediction (ATMVP) candidate. In some embodiments, the one or more spatial neighboring blocks are different from all candidates in the merge list of the current block. In some embodiments, the one or more spatial neighboring blocks include a block adjacent to a top-left corner of the current block. In some embodiments, a subset of the one or more spatial neighboring blocks is same as one or more candidates that are derived from a merge list construction process of a video block. In some embodiments, the one or more spatial neighboring blocks include a first block adjacent to a bottom-left corner of the current block or a second block adjacent to a top-right corner of the current block.

In some embodiments, the motion information is scaled before the temporal neighboring block is identified. In some embodiments, the spatial neighboring block is selected based on information in a video parameter set (VPS), a sequence parameter set (SPS), a picture parameter set (PPS), a slice header, a tile group header, a coding tree unit (CTU), a tile, a coding unit (CU), a prediction unit (PU) or a CTU row. In some embodiments, the spatial neighboring block is selected based on a height or a width of the current block.

Figure 19:
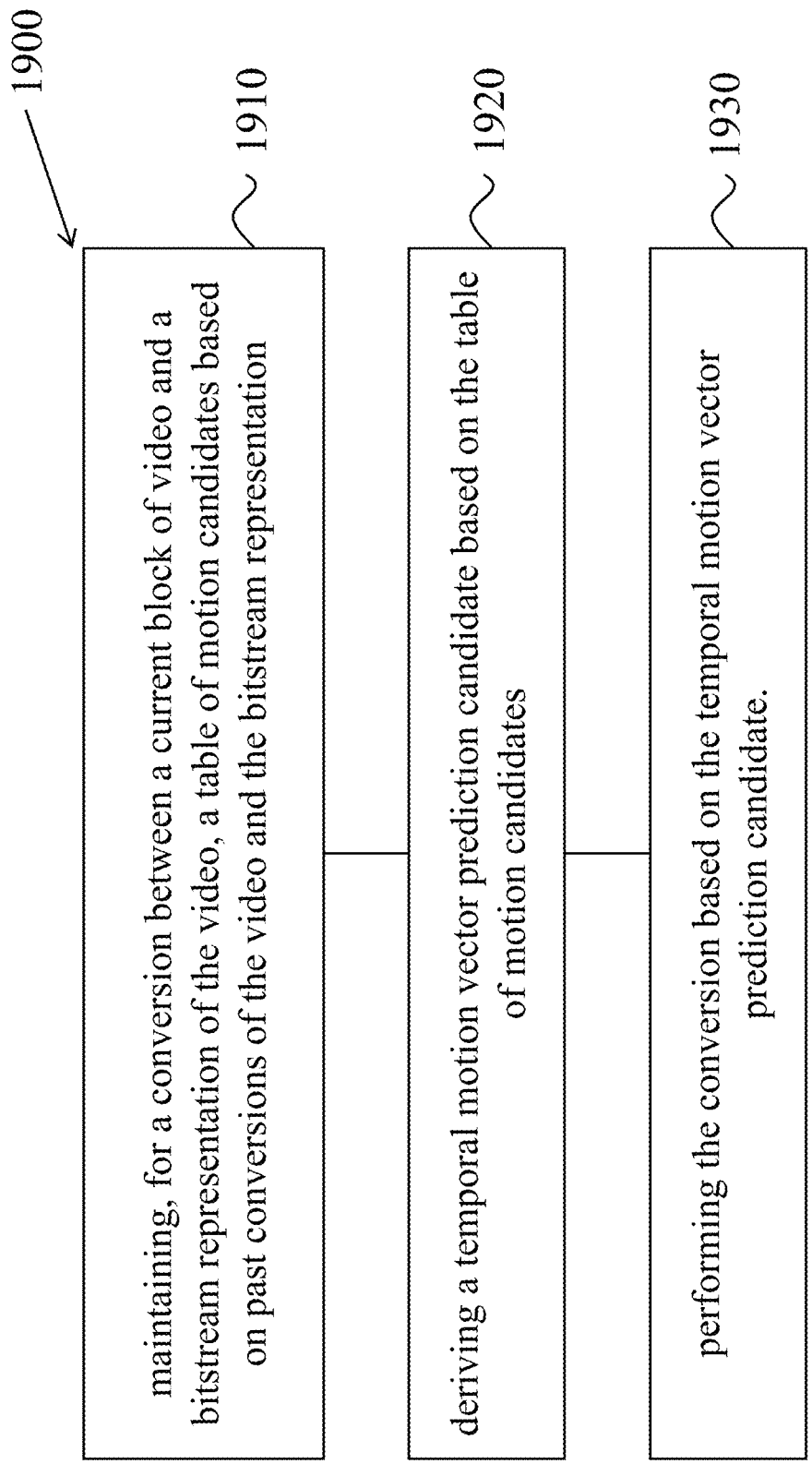
FIG. 19 is a flowchart representation of another method for video processing in accordance with the present disclosure.

FIG. 19 is a flowchart representation of a method 1900 for video processing in accordance with the present disclosure. The method 1900 includes, at operation 1910, maintaining, for a conversion between a current block of a video and a bitstream representation of the video, a table of motion candidates based on past conversions of the video and the bitstream representation. The method 1900 includes, at operation 1920, deriving a temporal motion vector prediction candidate based on the table of motion candidates. The method 1900 also includes, at operation 1930, performing the conversion based on the temporal motion vector prediction candidate.

In some embodiments, the temporal motion vector prediction candidate includes an Alternative Temporal Motion Vector Prediction (ATMVP) candidate. In some embodiments, the temporal motion vector prediction candidate is scaled prior to the conversion. In some embodiments, the method includes updating the table of motion candidates based on the temporal motion vector prediction candidate. In some embodiments, the method includes performing a subsequent conversion of the video and the bitstream representation using the updated table of motion candidates. In some embodiments, deriving the temporal motion vector prediction candidate further comprises deriving the temporal motion vector prediction candidate based on spatial neighboring blocks of a second video block.

Figure 20:
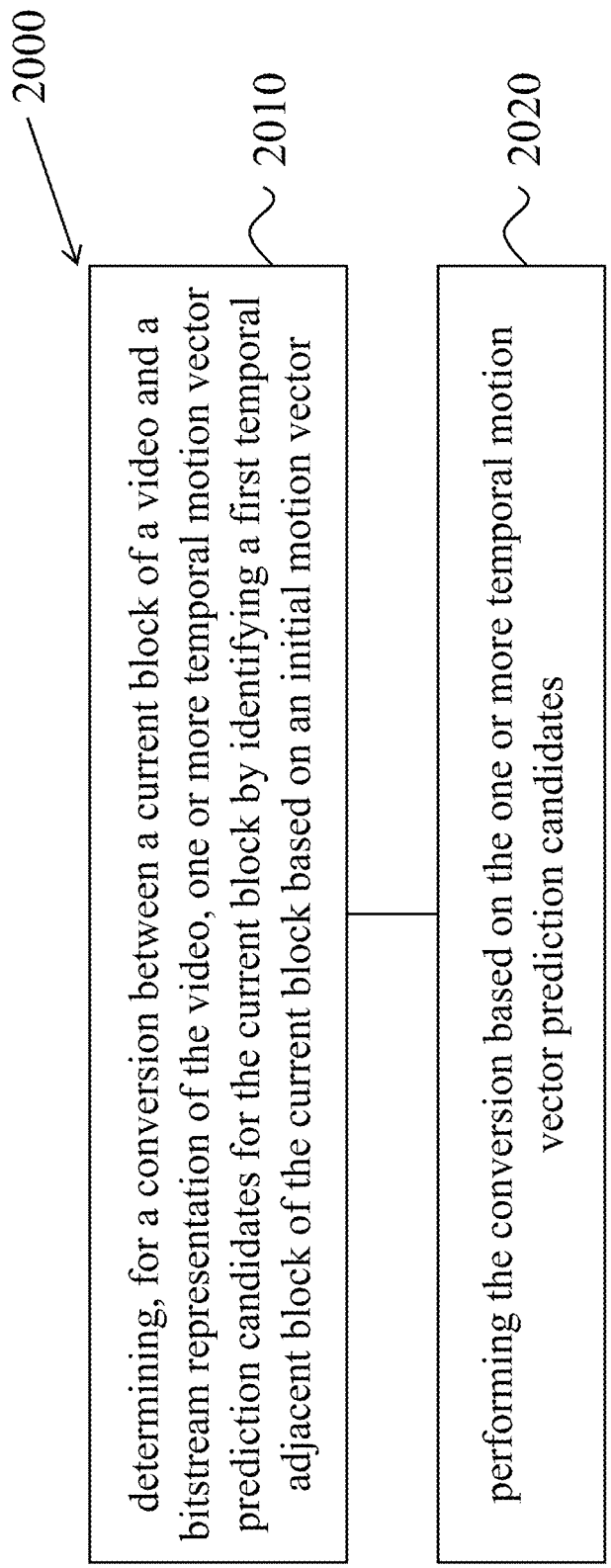
FIG. 20 is a flowchart representation of another method for video processing in accordance with the present disclosure.

FIG. 20 is a flowchart representation of a method 2000 for video processing in accordance with the present disclosure. The method 2000 includes, at operation 2010, determining, for a conversion between a current block of a video and a bitstream representation of the video, one or more temporal motion vector prediction candidates for the current block. The method 2000 also includes, at operation 2020, performing the conversion based on the one or more temporal motion vector prediction candidates. The one or more temporal motion vector prediction candidates can be determined by identifying a first temporal adjacent block of the current block based on an initial motion vector and examining additional temporal adjacent blocks to obtain the one or more temporal motion vector prediction candidates. The first temporal adjacent block includes invalid motion information.

In some embodiments, the one or more temporal motion vector prediction candidates include an Alternative Temporal Motion Vector Prediction (ATMVP) candidate. In some embodiments, the first temporal adjacent block is intra-coded. In some embodiments, the additional temporal adjacent blocks comprise a second temporal adjacent block that includes a starting point positioned adjacent to a bottom-right corner of a starting point of the first adjacent temporal block.

In some embodiments, the additional temporal adjacent blocks are identified based on a sequential multi-step search of blocks associated with the first temporal adjacent block. In some embodiments, the sequential multi-step search comprises examining spatial adjacent blocks of the first temporal adjacent block in an order of left, above, right, and bottom. In some embodiments, the sequential multi-step search further comprises examining spatial non-adjacent blocks that are one step away from the first temporal adjacent block in an order of left, above, right, and bottom. In some embodiments, the additional temporal adjacent blocks are positioned within a region associated with the first temporal adjacent block. In some embodiments, the region includes a Coding Tree Unit (CTU) associated with the first temporal adjacent block. In some embodiments, the region includes a single row of the CTU associated with the first temporal adjacent block.

Figure 21:
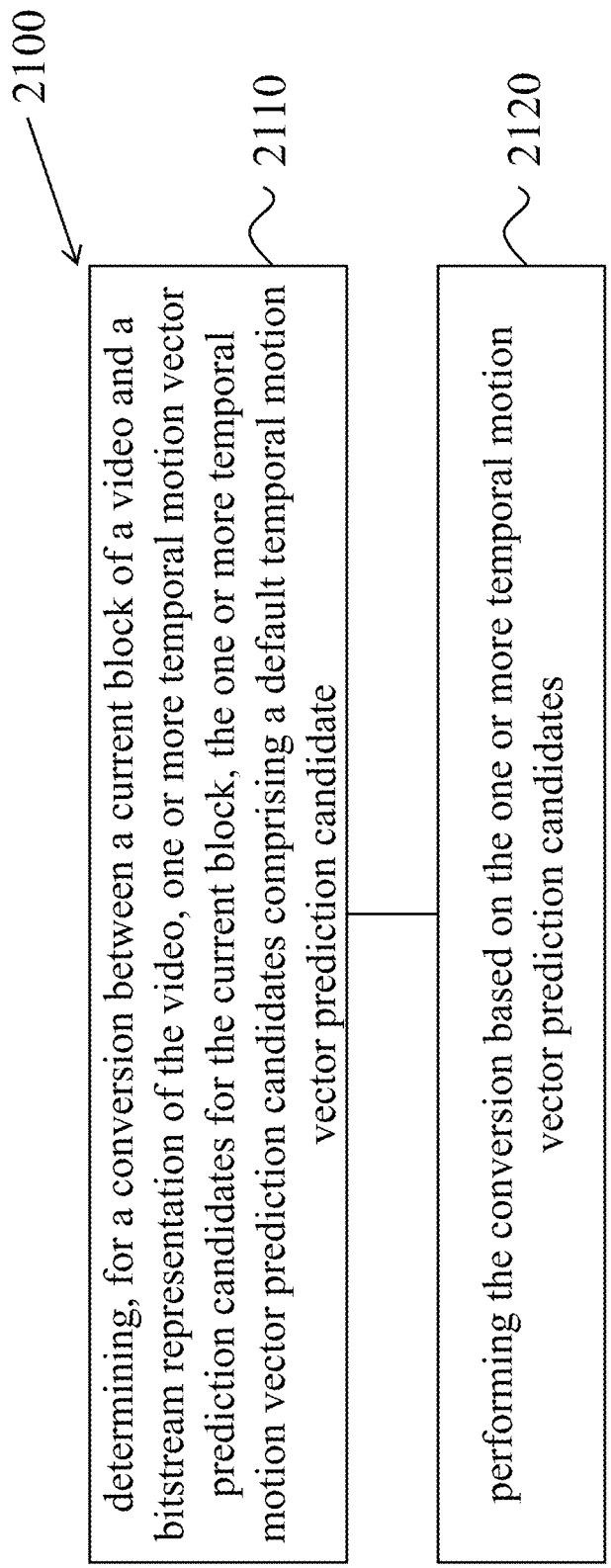
FIG. 21 is a flowchart representation of another method for video processing in accordance with the present disclosure.

FIG. 21 is a flowchart representation of a method 2100 for video processing in accordance with the present disclosure. The method 2100 includes, at operation 2110, determining, for a conversion between a current block of a video and a bitstream representation of the video, one or more temporal motion vector prediction candidates for the current block. The one or more temporal motion vector prediction candidates comprise a default temporal motion vector prediction candidate. The method 2100 includes, at operation 2120, performing the conversion based on the one or more temporal motion vector prediction candidates.

In some embodiments, the default temporal motion vector prediction candidate is determined after identifying a first temporal adjacent block of the current block based on an initial motion vector. The first temporal adjacent block includes invalid motion information. In some embodiments, the default temporal motion vector is inherited from a spatial neighboring block of the current block. In some embodiments, the default temporal motion vector is scaled. In some embodiments, the default temporal motion vector prediction candidate is derived based a starting point motion vector (or an initial motion vector). The starting point motion vector (or the initial motion vector) is either associated with a spatial adjacent block of the current block or a zero motion vector. In some embodiments, the starting point motion vector is completely determined based on motion information associated with one or more spatial adjacent blocks of the current block. In some embodiments, the starting point motion vector is associated with a block whose corresponding reference picture is collocated with a reference picture of the current block. In some embodiments, the block includes a spatial adjacent block of the current block, a spatial non-adjacent block of the current block, or a temporal adjacent block of the current block.

In some embodiments, in case a first spatial adjacent block selected from spatial adjacent blocks of the current block according to a sequential order is inter-coded and a first motion vector of the first spatial adjacent block is directed to a collocated picture of the current block, the starting motion vector is determined to be the first motion vector, and wherein the starting motion vector is determined to be a zero motion vector otherwise. In some embodiments, the starting point motion vector is determined to be motion information of a represented block in case motion information of the represented block that is identified by the starting point motion vector and a center position of the block is unavailable. The represented block is a block that covers a point corresponding to the starting point motion vector in a collocated picture. In some embodiments, the starting point motion vector is used to derive sub-block motion.

In some embodiments, the default temporal motion vector is a uni-prediction candidate derived by scaling a motion vector to a reference picture index within a reference picture list X, X being 0 or 1. In some embodiments, the reference picture index is 0. In some embodiments, the reference picture index is a smallest reference picture index that corresponds to a short-term reference picture. In some embodiments, X is determined based on a slice or a picture associated with the current block.

In some embodiments, the default temporal motion vector is a bi-prediction candidate derived by scaling a motion vector to a reference picture index within a reference picture list. In some embodiments, for each reference picture in the reference picture list, the reference picture index is same as a target reference picture index of a temporal motion vector prediction candidate. In some embodiments, whether the default temporal motion vector is uni-prediction candidate or a bi-prediction candidate is determined based on a picture type of a slice type associated with the current block. In some embodiments, whether the default temporal motion vector is uni-prediction candidate or a bi-prediction candidate is determined based on a size of the current block.

Figure 22:
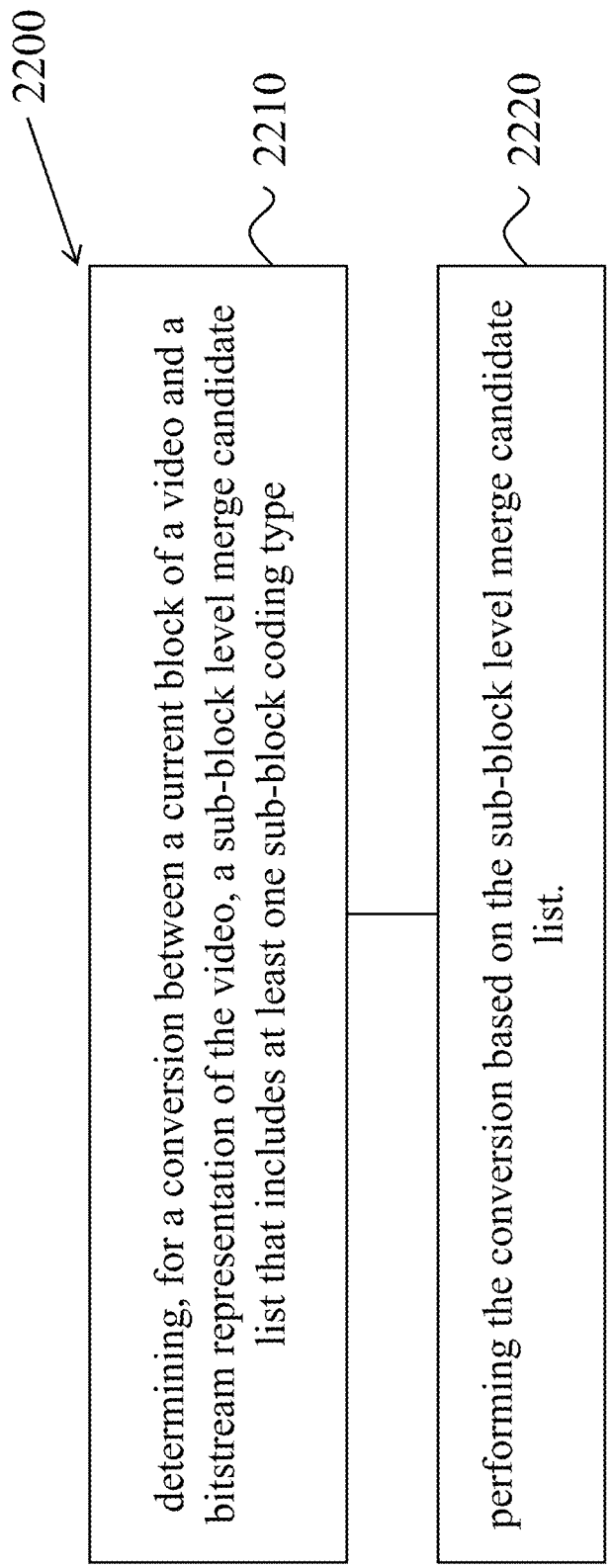
FIG. 22 is a flowchart representation of another method for video processing in accordance with the present disclosure.

FIG. 22 is a flowchart representation of a method 2200 for video processing in accordance with the present disclosure. The method 2200 includes, at operation 2210, determining, for a conversion between a current block of a video and a bitstream representation of the video, a sub-block level merge candidate list that includes at least one sub-block coding type. The method 2200 includes, at operation 2220, performing the conversion based on the sub-block level merge candidate list.

In some embodiments, the at least one sub-block coding type comprises a sub-block based temporal motion vector prediction coding type. In some embodiments, at least one sub-block coding type comprises an affine motion prediction coding type. In some embodiments, each of at least one sub-block coding type is assigned with a range of merge indices. In some embodiments, the merge index within a first range corresponds to the sub-block based temporal motion vector prediction coding type. In some embodiments, the first range includes a single value of 0. In some embodiments, the merge index within a second range corresponds to the affine motion prediction coding type. In some embodiments, the second range excludes a value of 0.

In some embodiments, a motion candidate of the sub-block based temporal motion vector prediction coding type is always available in the sub-block level merge candidate list. In some embodiments, temporal information is only allowed to derive motion candidates of the sub-block based temporal motion vector prediction coding type. In some embodiments, the range of merge indices for a coding type is signaled in a video parameter set (VPS), a sequence parameter set (SPS), a picture parameter set (PPS), a slice header, a tile group header, a coding tree unit (CTU), a tile, a coding unit (CU), a prediction unit (PU) or a CTU row. In some embodiments, the range of merge indices for a coding type is based on a width or a height of the current block.

In some embodiments, motion candidates of the at least one sub-block coding type are added to the sub-block level merge candidate list based on an adaptive ordering. In some embodiments, the adaptive ordering indicates that a motion candidate of the sub-block based temporal motion vector prediction coding type is added to the sub-block level merge candidate list prior to a motion candidate of the affine motion prediction coding type. In some embodiments, the adaptive ordering indicates a motion candidate of the sub-block based temporal motion vector prediction coding type and a motion candidate of the affine motion prediction type are added to the sub-block level merge candidate list in an interleaved manner. In some embodiments, the adaptive ordering is based on coded information of the current block or neighboring blocks of the current block. In some embodiments, in case a majority of the neighboring blocks of the current block is affine coded, the adaptive ordering indicates that a motion candidate of the affine motion prediction coding type is added to the sub-block level merge candidate list prior to motion candidates of other types. In some embodiments, the adaptive ordering is based on a ratio of affine motion candidates to non-affine motion candidates in the sub-block level merge candidate list. In some embodiments, in case the ratio is greater than a threshold, the adaptive ordering indicates that a motion candidate of the affine motion coding type is added to the sub-block level merge candidate list prior to motion candidates of other types. In some embodiments, the adaptive ordering is applicable to first K affine motion candidates in the sub-block level merge candidate list, K being a positive integer. In some embodiments, the adaptive ordering is signaled by in a video parameter set (VPS), a sequence parameter set (SPS), a picture parameter set (PPS), a slice header, a tile group header, a coding tree unit (CTU), a tile, a coding unit (CU), a prediction unit (PU) or a CTU row.

Figure 23:
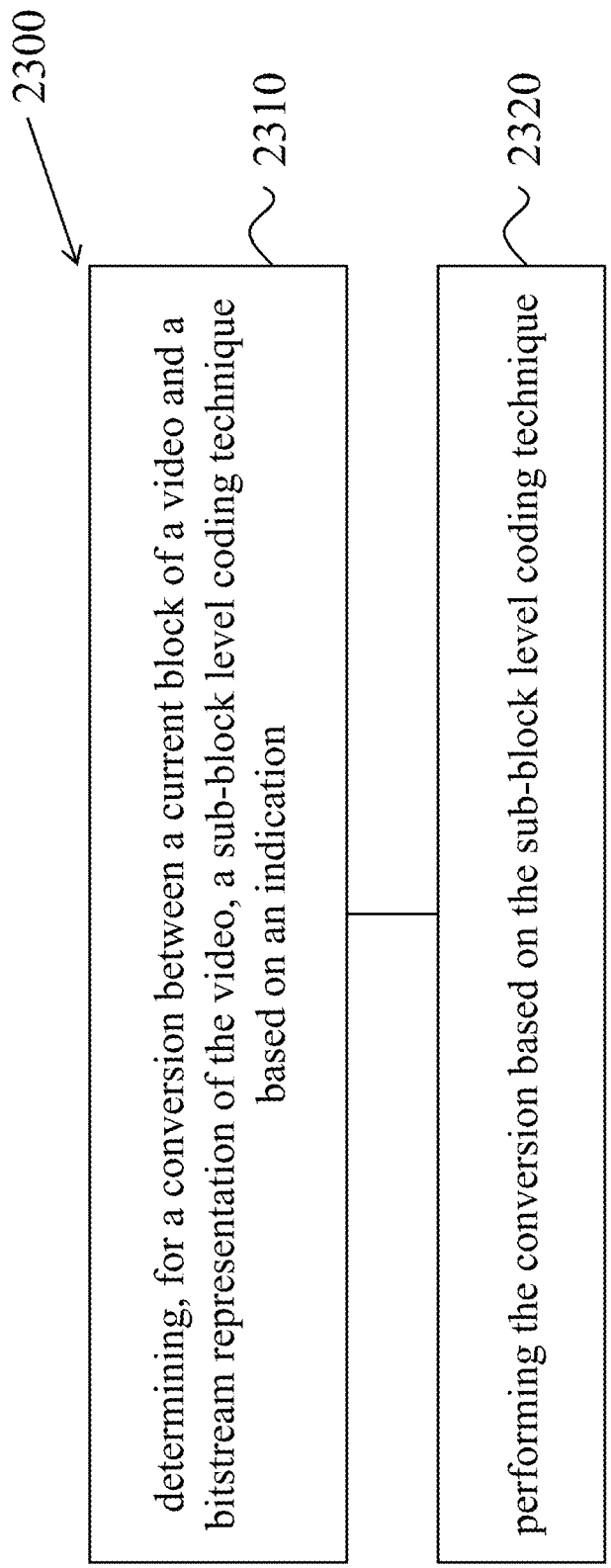
FIG. 23 is a flowchart representation of another method for video processing in accordance with the present disclosure.

FIG. 23 is a flowchart representation of a method 2300 for video processing in accordance with the present disclosure. The method 2300 includes, at operation 2310, determining, for a conversion between a current block of a video and a bitstream representation of the video, a sub-block level coding technique based on an indication that is signaled in a picture header, a picture parameter set (PPS), a slice header, or a tile group header. The method 2300 includes, at operation 2320, performing the conversion based on the sub-block level coding technique.

In some embodiments, the sub-block level coding technique comprises a sub-block based temporal motion vector prediction coding technique. In some embodiments, the sub-block level coding technique comprises an affine coding technique. In some embodiments, the indication indicates that the sub-block coding technique is disabled.

Figure 24A:
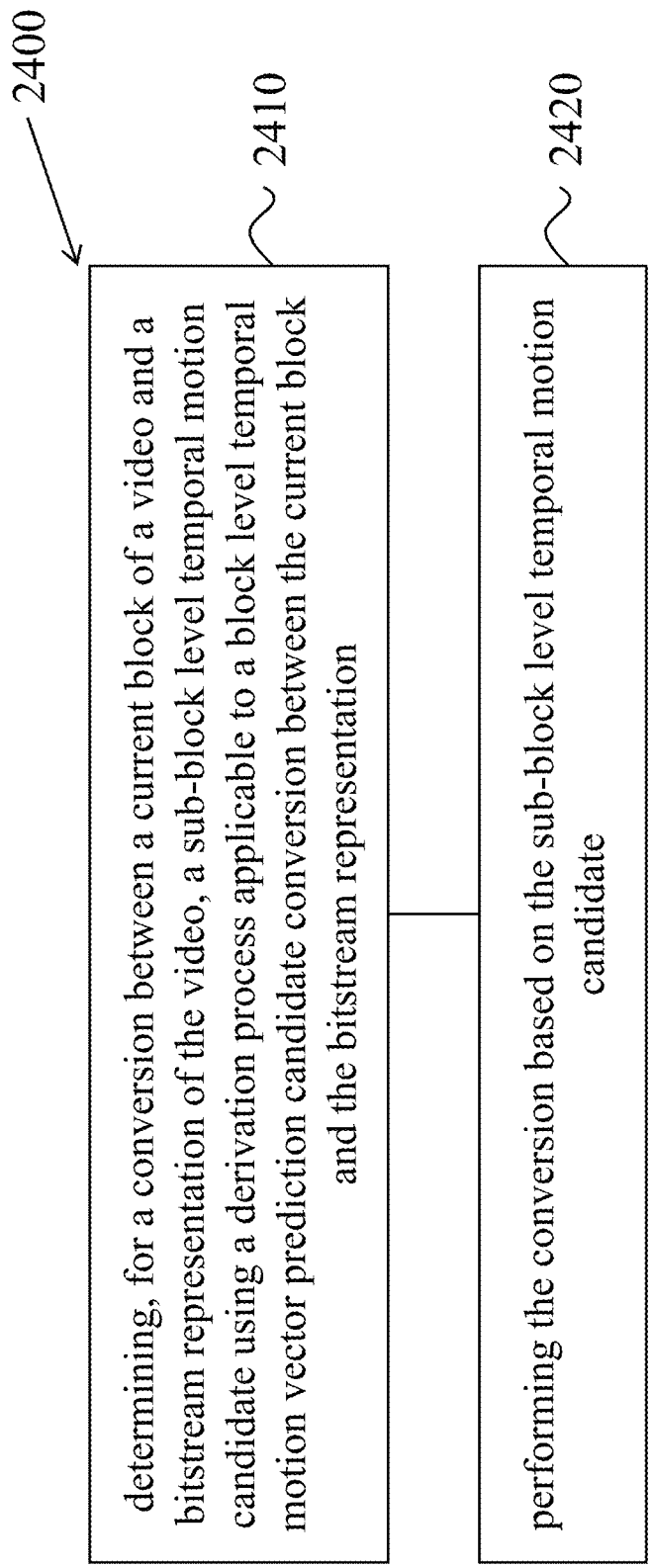
FIG. 24A is a flowchart representation of another method for video processing in accordance with the present disclosure.
Figure 24B:
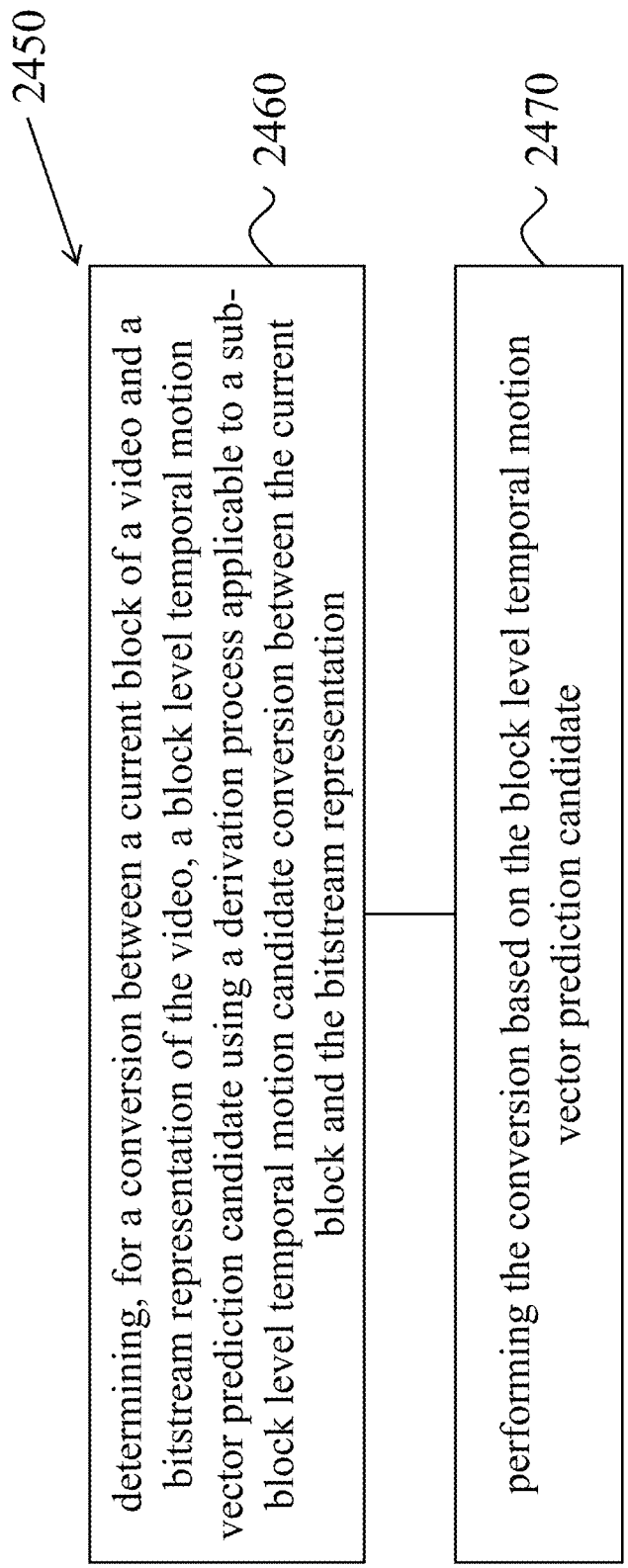
FIG. 24B is a flowchart representation of yet another method for video processing in accordance with the present disclosure.

In some embodiments, the sub-block level motion derivation process and the block level motion derivation process can be unified. FIG. 24A is a flowchart representation of a method 2400 for video processing in accordance with the present disclosure. The method 2400 includes, at operation 2410, determining, for a conversion between a current block of a video and a bitstream representation of the video, a sub-block level temporal motion candidate using a derivation process applicable to a block level temporal motion vector prediction candidate conversion between the current block and the bitstream representation. The method 2400 also includes, at operation 2420, performing the conversion based on the sub-block level temporal motion candidate. FIG. 24B is a flowchart representation of a method 2450 for video processing in accordance with the present disclosure. The method 2450 includes, at operation 2460, determining, for a conversion between a current block of a video and a bitstream representation of the video, a block level temporal motion vector prediction candidate using a derivation process applicable to a sub-block level temporal motion candidate conversion between the current block and the bitstream representation. The method 2450 also includes, at operation 2360, performing the conversion based on the block level temporal motion vector prediction candidate.

In some embodiments, the conversion in the above methods comprises encoding the current block to generate the bitstream representation. In some embodiments, the conversion in the above methods comprises decoding the bitstream representation to generate the current block.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered example only, where example means an example. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
   determining, for a conversion between a current video block of a video and a bitstream of the video, a sub-block level merge candidate list that includes at least one sub-block coding type; and
   performing the conversion based on the sub-block level merge candidate list, wherein a sub-block based temporal motion vector prediction candidate is acquired from the sub-block level merge candidate list to perform the conversion;
   wherein motion candidates of the at least one sub-block coding type are added to the sub-block level merge candidate list based on an adaptive ordering,
   wherein a History-based MV Prediction (HMVP) candidate fetched from an HMVP list is used to derive the sub-block based temporal motion vector prediction candidate, and the HMVP candidate is scaled prior to deriving the sub-block based temporal motion vector prediction candidate, and
   wherein the HMVP list is constructed using motion information from previously coded blocks, and the derived sub-block based temporal motion vector prediction candidate is added to the HMVP list after pruning is performed.

2. The method of claim 1, wherein the at least one sub-block coding type comprises a sub-block based temporal motion vector prediction coding type and an affine motion prediction coding type.

3. The method of claim 2, wherein each of at least one sub-block coding type is assigned with a range of merge indices, and wherein a merge index within a first range corresponds to the sub-block based temporal motion vector prediction coding type, and the first range includes a single value of 0.

4. The method of claim 3, wherein the merge index within a second range corresponds to the affine motion prediction coding type, and wherein the second range excludes a value of 0.

5. The method of claim 2, wherein a motion candidate of the sub-block based temporal motion vector prediction coding type is always available in the sub-block level merge candidate list, and wherein temporal information is only allowed to derive motion candidates of the sub-block based temporal motion vector prediction coding type.

6. The method of claim 1, wherein a range of merge indices for a coding type is signaled in a video parameter set (VPS), a sequence parameter set (SPS), a picture parameter set (PPS), a slice header, a tile group header, a coding tree unit (CTU), a tile, a coding unit (CU), a prediction unit (PU) or a CTU row, and the range of merge indices for a coding type is based on a width or a height of the current video block.

7. The method of claim 2, wherein the adaptive ordering indicates that a motion candidate of the sub-block based temporal motion vector prediction coding type is added to the sub-block level merge candidate list prior to a motion candidate of the affine motion prediction coding type, or the adaptive ordering indicates a motion candidate of the sub-block based temporal motion vector prediction coding type and a motion candidate of the affine motion prediction coding type are added to the sub-block level merge candidate list in an interleaved manner.

8. The method of claim 2, wherein the adaptive ordering is based on coded information of the current video block or neighboring blocks of the current video block, and wherein, in case a majority of the neighboring blocks of the current video block is affine-coded, the adaptive ordering indicates that a motion candidate of the affine motion prediction coding type is added to the sub-block level merge candidate list prior to motion candidates of other types.

9. The method of claim 2, wherein the adaptive ordering is based on a ratio of affine motion candidates to non-affine motion candidates in the sub-block level merge candidate list, and wherein, in case the ratio is greater than a threshold, the adaptive ordering indicates that a motion candidate of the affine motion prediction coding type is added to the sub-block level merge candidate list prior to motion candidates of other types.

10. The method of claim 1, wherein the adaptive ordering is applicable to first K affine motion candidates in the sub-block level merge candidate list, K being a positive integer.

11. The method of claim 1, wherein the adaptive ordering is signaled by in a video parameter set (VPS), a sequence parameter set (SPS), a picture parameter set (PPS), a slice header, a tile group header, a coding tree unit (CTU), a tile, a coding unit (CU), a prediction unit (PU) or a CTU row.

12. The method of claim 1, further comprising:
   determining, for the conversion, a sub-block level coding technique based on an indication that is signaled in a picture header, a picture parameter set (PPS), a slice header, or a tile group header; and
   performing the conversion at least based on the sub-block level coding technique.

13. The method of claim 12, wherein the sub-block level coding technique comprises a sub-block based temporal motion vector prediction coding technique and an affine coding technique.

14. The method of claim 12, wherein the indication indicates that the sub-block level coding technique is disabled.

15. The method of claim 1, further comprising:
determining, for the conversion, a sub-block level temporal motion candidate using a derivation process applicable to a block level temporal motion vector prediction candidate conversion between the current video block and the bitstream; and
performing the conversion at least based on the sub-block level temporal motion candidate.

16. The method of claim 1, further comprising:
determining, for the conversion, a block level temporal motion vector prediction candidate using a derivation process applicable to a sub-block level temporal motion candidate conversion between the current video block and the bitstream; and
performing the conversion at least based on the block level temporal motion vector prediction candidate.

17. The method of claim 1, wherein the conversion includes decoding the current video block from the bitstream.

18. The method of claim 1, wherein the conversion includes encoding the current video block into the bitstream.

19. An apparatus for processing video data comprising a processor and a non-transitory memory with instructions thereon, wherein the instructions upon execution by the processor, cause the processor to:
determine, for a conversion between a current video block of a video and a bitstream of the video, a sub-block level merge candidate list that includes at least one sub-block coding type; and
perform the conversion based on the sub-block level merge candidate list, wherein a sub-block based temporal motion vector prediction candidate is acquired from the sub-block level merge candidate list to perform the conversion;
wherein motion candidates of the at least one sub-block coding type are added to the sub-block level merge candidate list based on an adaptive ordering,
wherein a History-based MV Prediction (HMVP) candidate fetched from an HMVP list is used to derive the sub-block based temporal motion vector prediction candidate, and the HMVP candidate is scaled prior to deriving the sub-block based temporal motion vector prediction candidate, and
wherein the HMVP list is constructed using motion information from previously coded blocks, and the derived sub-block based temporal motion vector prediction candidate is added to the HMVP list after pruning is performed.

20. A non-transitory computer-readable recording medium storing a bitstream of a video which is generated by a method performed by a video processing apparatus, wherein the method comprises:
determining, for a current video block of the video, a sub-block level merge candidate list that includes at least one sub-block coding type; and
generating the bitstream based on the sub-block level merge candidate list, wherein a sub-block based temporal motion vector prediction candidate is acquired from the sub-block level merge candidate list to generate the bitstream;
wherein motion candidates of the at least one sub-block coding type are added to the sub-block level merge candidate list based on an adaptive ordering,
wherein a History-based MV Prediction (HMVP) candidate fetched from an HMVP list is used to derive the sub-block based temporal motion vector prediction candidate, and the HMVP candidate is scaled prior to deriving the sub-block based temporal motion vector prediction candidate, and
wherein the HMVP list is constructed using motion information from previously coded blocks, and the derived sub-block based temporal motion vector prediction candidate is added to the HMVP list after pruning is performed.

* * * * *